US007899885B2

(12) United States Patent
Aultman et al.

(10) Patent No.: US 7,899,885 B2
(45) Date of Patent: Mar. 1, 2011

(54) BUSINESS ENTERPRISE BACKUP AND RECOVERY SYSTEM AND METHOD

(75) Inventors: Joseph L. Aultman, Pelham, AL (US); Richard J. Kittinger, Hoover, AL (US)

(73) Assignee: AT&T Intellectual Property I, LP, Reno, NV (US)

( * ) Notice: Subject to any disclaimer, the term of this patent is extended or adjusted under 35 U.S.C. 154(b) by 1638 days.

(21) Appl. No.: 10/698,060

(22) Filed: Oct. 30, 2003

(65) Prior Publication Data
US 2005/0021869 A1 Jan. 27, 2005

Related U.S. Application Data

(60) Provisional application No. 60/483,216, filed on Jun. 27, 2003.

(51) Int. Cl.
*G06F 15/16* (2006.01)
(52) U.S. Cl. .................. 709/219; 709/217
(58) Field of Classification Search .......... 709/219, 709/217
See application file for complete search history.

(56) References Cited

U.S. PATENT DOCUMENTS

| | | | |
|---|---|---|---|
| 6,606,690 B2* | 8/2003 | Padovano | 711/148 |
| 6,783,367 B1* | 8/2004 | Wang et al. | 434/276 |
| 6,963,590 B1* | 11/2005 | Mann et al. | 370/535 |
| 7,162,597 B2* | 1/2007 | Nishimura et al. | 711/162 |
| 7,191,225 B1* | 3/2007 | Borthakur | 709/213 |
| 2002/0069369 A1* | 6/2002 | Tremain | 713/201 |
| 2002/0116452 A1* | 8/2002 | Johnson et al. | 709/203 |
| 2002/0163910 A1* | 11/2002 | Wisner et al. | 370/389 |
| 2002/0165942 A1* | 11/2002 | Ulrich et al. | 709/219 |
| 2003/0172130 A1* | 9/2003 | Fruchtman et al. | 709/219 |

\* cited by examiner

*Primary Examiner*—Tonia L Dollinger
*Assistant Examiner*—Mark D Fearer
(74) *Attorney, Agent, or Firm*—Parks IP Law LLC; JennIfer P. Medlin Esq.

(57) ABSTRACT

A data backup and recovery system that includes a backup and recovery (EBR) management network system. The EBR management network system includes an infrastructure for performing information storage, backup, and recovery operations for a business enterprise that is fully scalable and sharable. The EBR management network system includes the following modular backup and recovery models: (1) LAN network based backup and recovery models for applications requiring <200 GB; (2) LAN network based GigE backup and recovery model for applications requiring >500 GB and <1.5 TB; LAN-Free dedicated tape drive backup and recovery models; (3) LAN-Free shared tape drive backup and recovery models; (4) Server-Free backup and recovery models; and (5) application storage manager (ASM) backup and recovery models.

17 Claims, 17 Drawing Sheets

BUSINESS ENTERPRISE BACKUP AND RECOVERY SYSTEM AND METHOD

CROSS REFERENCE TO RELATED APPLICATION

This application claims the benefit under 35 U.S.C. §119(e) to U.S. Provisional Application No. 60/483,216, filed Jun. 27, 2003, the contents of which are herein incorporated by reference in their entirety including the Appendix appended thereto.

BACKGROUND

Conventional backup and recovery system architectures using UNIX and Intel backup capabilities may be limited due to the distributed architecture that is used. Each server, for example, may include its own backup methods that may not be easily scalable and may not have the capability of sharing backup infrastructure components with other servers on a distributed network. This may lead to a very inefficient use of computing resources and an over provisioning of hardware/software components. The distributed architecture also may require the conventional backup and recovery application to be taken down each time a backup is needed, thus impacting the availability of the application. Conventional disaster recovery capabilities also may be limited and may require a manually intensive effort to ensure vaulted data is taken off-site. Thus, because of these limitations, conventional backup and recovery systems and methods for UNIX and Intel backup methods may provide only limited backup and off-site vaulting coverage.

SUMMARY

According to one aspect, various embodiments of the invention provides enterprise data backup and recovery system. The system includes a first network and a second network in communication through a third network. The first network includes a first processor layer, a first storage area network layer in communication with the first processor layer, and a first storage layer in communication with the first storage area network layer. The second network includes a second processor layer, a second storage area network in communication with the second processor layer, and a second storage layer in communication with the second storage are network layer. The first and second storage layers are shared by the first and second networks via the third network and the information stored in the first storage layer is transferred to the second storage layer via the third network under the control of the first processor layer.

Other systems, methods, and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The embodiments of the present invention may be better understood by referring to the following description taken in conjunction with the accompanying drawings, in which.

DESCRIPTION

Referring now to the several drawings in which identical elements are numbered identically throughout, a description of this invention now will be provided, in which exemplary embodiments are shown in the several figures. This invention may, however, be embodied in many different forms and should not be construed as being limited to the embodiments set forth herein. Rather, these embodiments are provided so that this disclosure will be thorough and complete, and will fully convey the scope of the invention to those having ordinary skill in the art. Furthermore, all statements herein reciting embodiments of the invention, as well as specific examples thereof, are intended to encompass both structural and functional equivalents thereof. Moreover, it is intended that such equivalents include both currently known equivalents as well as equivalents developed in the future for performing the same function, regardless of structure. Thus, those skilled in the art will appreciate that the schematic drawings presented herein and the like, represent conceptual views of illustrative structures which may embody the various aspects of this invention.

In the claims appended hereto any element expressed as a means for performing a specified function is to encompass any way of performing that function including, for example, a combination of elements that perform that function. Furthermore the invention as defined by such means-plus-function claims resides in the fact that the functionalities provided by the various recited means are combined and brought together in the manner that the claims called for. Therefore, any means that can provide such functionalities may be considered equivalents to the means shown herein.

Figure 1:
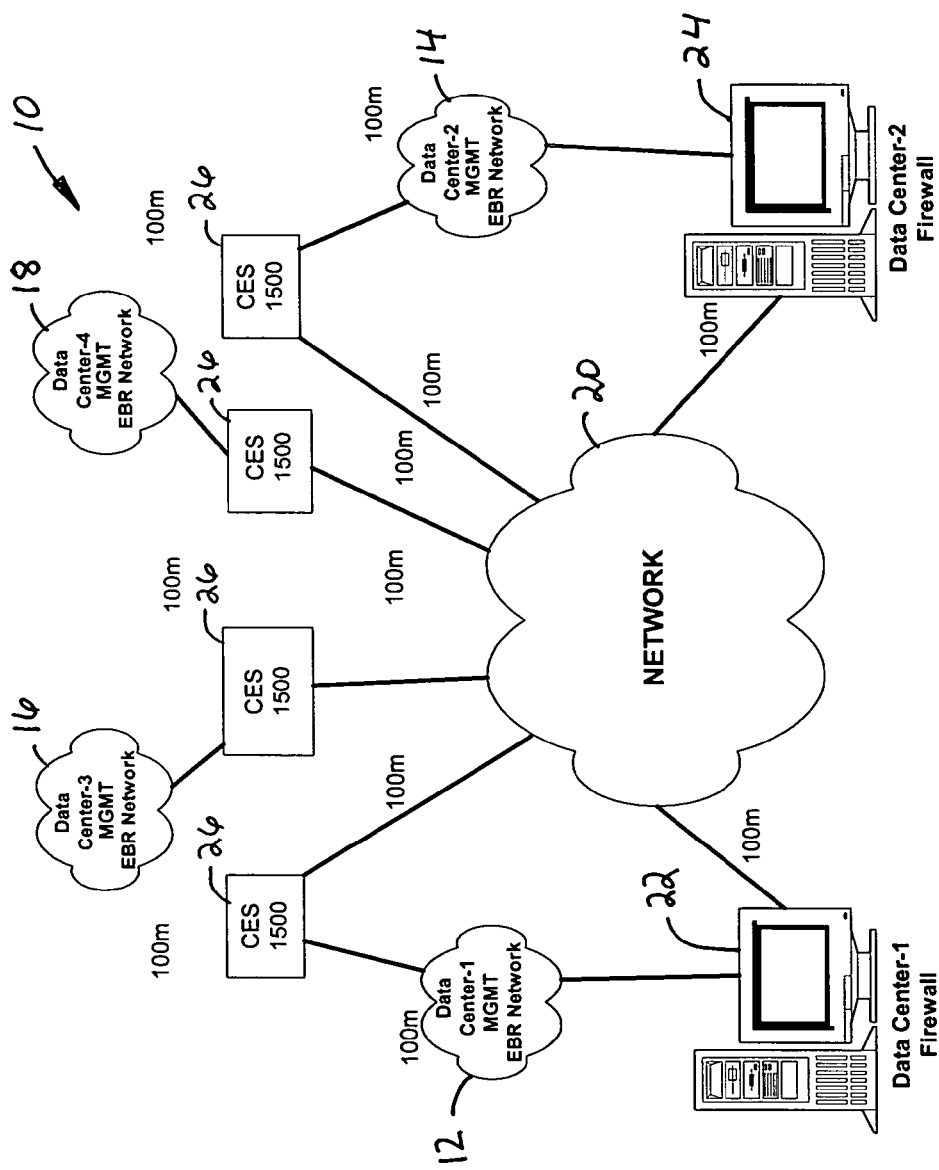
FIG. 1 illustrates one embodiment of an enterprise backup and recovery (EBR) management network system.

FIG. 1 illustrates an embodiment of an enterprise backup and recovery (EBR) management network system 10 for a business enterprise. The EBR management network system 10 represents one of many embodiments of an overall wide area network (WAN) implementation of an EBR infrastructure for performing information storage, backup, and recovery operations for a business enterprise. The various embodiments of the present invention provide an EBR management network system 10 and methods for storing, backing up information, and recovering information after a disaster. The EBR management network system 10 generally comprises, for example, hardware, software, design templates, and processes for storing, backing up, and restoring business enterprise information. The EBR management network system 10 according to the various embodiments of the present invention described herein comprises a fully scalable and sharable infrastructure for supporting particular software applications throughout their entire lifecycle. Furthermore, the EBR management network system 10 includes a variety of EBR network structures and data backup and recovery models ranging from a simple network based backup system and method to a fully non-disruptive Storage Area Network (SAN) backup system and method capable of moving hundreds of Tera Bytes of information in a 24 hour period. (1 Tera Byte=1 Trillion Bytes.)

For illustrative purposes, the EBR management network system 10 is shown as a WAN serving as a backup and recovery infrastructure for business enterprises having data centers geographically spread out over a wide region. The WAN infrastructure of the EBR management network system 10 is a secure WAN and spanning across four data centers having four separate EBR networks 12, 14, 16, and 18 for managing the information storage, backup, and recovery operations at each of the four data centers referred to herein as Data Centers-1, 2, 3, and 4, respectively. Those skilled in the art will appreciate, however, that in other embodiments of the EBR management network system 10 includes a plurality of EBR networks located at a plurality of enterprise data centers wherein each of the plurality of EBR networks are implemented using a plurality of modular build-out backup and recovery models that provide scalable backup and recovery support for applications in the Mega-Bytes (MB), Giga-Bytes (GB), and Tera-Bytes (TB) ranges, depending on the specific implementation of the EBR management network system 10. Those skilled in the art also will appreciate that the EBR networks 12, 14, 16, 18 at the Data Centers 1-4, respectively, can be located across a large geographic region encompassing different cities, different states, and different countries, for example.

In one of many embodiments of the present invention, information traffic between the individual EBR networks 12, 14, 16, 18 is routed via a network 20. The information exchanged through the network 20 is secure to provide a secure domain WAN as the EBR management network system 10 infrastructure. Connectivity for the WAN across a secure domain network is provided, for example, by installing firewall routers 22, 24 and one or more Connectivity Extranet Switch 26 (CES) boxes in the EBR system's 10 network core. The WAN capability of the EBR management network system's 10 comprises a 10/100-connection throughput (Ethernet/Fast Ethernet 10 Mbps and 100 Mbps on the same port), for example. The WAN capabilities can be enhanced for the purpose of implementing a SAN over a TCP/IP connection using a Nortel 8600 routing switch to enhance the EBR system's 10 WAN capabilities. The WAN connectivity provides the central management and control for the EBR management network system 10 infrastructure, although generally it is not required for core backup and recovery functionality at the EBR networks 12, 14, 16, 18.

Various embodiments of the present invention provide EBR networks 12, 14, 16, 18 that are interconnected via a variety of different types and variations of the network 20, which includes computer networks, telecommunication networks, and the like, and is not intended to be limited to the examples of the specific network 20 described herein. Rather, the many embodiments of the present invention may be practiced in a variety of network operating environments including, for example, computer networks and telecommunications systems networks comprising packet-switches, servers, and modules capable of transmitting and receiving information in the form of packets between various devices interconnected over any predetermined computer and telecommunications networks. For example, the many embodiments of the present invention can operate in various communications environments including, but not limited to, TCP/IP, packet-switched networks, Voice over Internet Protocol (VoIP), wireless Fidelity (WiFi), Bluetooth, Ultrawideband, and other operating communications environments.

Various EBR networks 12, 14, 16, 18 may be employed in conjunction with variations of the network 20. Such variations of the network 20 include, for example, WAN, LAN, Ethernet, Internet, Web-based networks, and telecommunication networks, among others. In various environments of the present invention, communication between networks can occur over computer networks interconnected via telephone lines such as a variety of digital transmission links including those provided by the local telephone company such as, for example, a digital subscriber line (DSL), an asymmetrical digital subscriber line (ADSL), a high bit rate digital subscriber line (HDSL), a single pair symmetrical services (SDSL), an integrated services digital network (ISDN) line, a T-1 digital transmission link, and/or a wireless communication line. Furthermore, in one of many embodiments of the present invention, information between the EBR networks 12, 14, 16, 18 can be moved using Asynchronous Transfer Mode (ATM) across the network 20.

Any one of the four data centers comprising the EBR networks 12, 14, 16, 18 can be connected to the network 20 via one or more firewall routers 22, 24 to provide secure connectivity with the EBR management network system 10. For example, the EBR management network system 10 shows the data center-1 and data center-2 interconnected to the network 20 via the firewall routers 22, 24, respectively. Those skilled in the art will appreciate that the firewall routers 22, 24 comprise hardware, software, and combinations thereof, designed to limit the exposure to an outside attack of the computers or networks of computers located in any of the four data centers.

Embodiments of the EBR management network system 10 according to the present invention also comprise software and hardware components configured as EBR servers, automated tape libraries, network component additions, and SAN hubs and switches. In various embodiments of the present invention, servers can be implemented as media servers and/or master servers within the EBR management network system 10 infrastructure and within each of the EBR networks 12, 14, 16, 18. Other backup and recovery processes and techniques can be integrated with the fundamental EBR networks 12, 14, 16, 18, such as, for example, Business Enterprise Customer Databases (ECDB), PMAP, ADSL, AMA, Long Distance, Exchange and NTI. The ECDB administrative servers can be utilized as master backup and recovery servers in any one of the EBR networks 12, 14, 16, 18, for example. In addition, many conventional LAN backup and recovery applications can be realized and/or integrated with the EBR management network system 10 and any of the distributed EBR networks 12, 14, 16, 18, without departing from the scope of the invention. Thus, the implementation of a common backup and recovery infrastructure for the EBR management network system 10 provides advantages for the business enterprise both operationally and in terms of shared capital efficiency.

Embodiments of the EBR management network system 10 according to the present invention also provide various software/hardware components and systems operating in concert to implement the EBR networks 12, 14, 16, 18. In one of various embodiments of the present invention, the EBR management network system 10 and method comprises hardware and software components, such as, for example, Automated Tape Libraries (ATL) provided by StorageTek, Fiber Channel attached 9840 tape drives also provided by StorageTek, Brocade Fiber Channel SAN switches, Nortel 8600 Gigabit Ethernet (GigE) network switches, EMC BCV TimeFinder software, Sun servers, Veritas NetBackup software, Veritas StorageTrack software, and StorageTek's Automated Storage Manager (ASM) software, and the like.

In one of various embodiments of the present invention, the EBR networks 12, 14, 16, 18 within the EBR management network system 10 infrastructure comprise master catalog structures using Veritas NetBackup software, for example. The master catalog may be employed for tracking all backup and recovery data for one or more physical entities, for example. In addition to the master catalog, the EBR management network system 10 includes one or more Veritas Media and Veritas Client instances that handle each individual application's backup requirements.

One of the many embodiments of the present invention also provides one or more processes or methods for implementing an operational EBR management network system 10. In one such embodiment of the present invention, pluralities of sequential steps are executed to realize a functional EBR management network system 10 as described in further detail below. For example, one of many embodiments of the present invention provides a scalable EBR management network system 10 design and infrastructure that maximizes shared infrastructure between remote data centers where possible. There are at least five design techniques or models that may be employed by any one of the EBR networks 12, 14, 16, 18 forming the EBR management network system 10. The at least five models taken alone or in combination provide modularity, scalability, and efficient utilization of software and hardware components distributed throughout the EBR management network system 10. For example, one of many embodiments of one of the EBR networks 12, 14, 16, 18 may be based upon any one of the following modular backup and recovery models: (1) LAN network based backup and recovery models for applications requiring <200 GB; (2) LAN network based GigE backup and recovery model for applications requiring >500 GB and <1.5 TB; LAN-Free dedicated tape drive backup and recovery models; (3) LAN-Free shared tape drive backup and recovery models; (4) Server-Free backup and recovery models; and (5) application storage manager (ASM) backup and recovery models.

Implementations of the various embodiments of the present invention employ a variety of software applications. For example, in one of the many embodiments of the present invention, a software application such as Veritas NetBackup is used to provide backup and recovery services for the EBR management network system 10. Veritas Vault software also may be used to provide Disaster Recovery and Records Retention creation and management. Bulk license arrangements for such software applications as the Veritas NetBackup and Vault and all the related extensions to the product are generally available to their users. In one of the many embodiments of the present invention, Veritas software applications may be used as the core backup and recovery applications within the business enterprise.

The various embodiments of the EBR management network system 10 according to the present invention also support recovery of information after a disaster through the identification of key business processes and critical corporate information, for example. One of many embodiments of the EBR management network system 10 uses the Veritas Vault software application, for example, to reprocess backed up information into application specific vaulted recovery tapes. One of many embodiments of the EBR management network system 10 also supports a 24-hour Recovery Point Objective (RPO), which can be achieved by reprocessing the most recent backup and storing that information in a vault within 24 hours of its creation. The vault and schedule for disaster recovery also may be fixed. Applications, which do not provide near real-time fail over, may be vaulted every 24 hours. In one of many embodiments of the present invention, the disaster recovery information includes three managed components, for example, such as dynamic critical information, operating systems information, and application binary information.

Embodiments of the EBR management network system 10 according to the present invention include backup systems where operating system(s) information is backed up quarterly and retained for 90 days, for example. Application binary information also can take a variable form depending on the specific application requirements. Dynamic information can be backed up daily, for example, and can be retained for two full weeks and seven cumulative incremental days, for example. This insures that two copies of any critical information are vaulted at all times. Embodiments of the EBR system's 10 disaster recovery also support rapid recovery of any key applications and business processes.

Embodiments of the EBR management network system 10 according to the present invention support business enterprise records retention. In one of many embodiments, records retention is implemented using Veritas Vault software, for example. The standards for record retention are based on security and legal requirements within the business enterprise and any business units of the business enterprise, for example. In one of many embodiments of the EBR management network system 10, the records retention standards can be completely flexible based on the specific application. Generally an application may provide a special request for information retention for any media associated with the request before it actually receives any records retention services. Such requests are granted for release management, legal, and business requirements. The business related reason(s) for the information retention request, file names or directories, estimated size, retention period requested, and frequency of information capture, may all be required information in order to provide an accurate estimate of the cost to implement the request. Once approval is given, the information retention rules may be established and data vaulting may begin.

The various embodiments of the present invention also provide scalability. Conventional distributed backup and recovery models and systems require different backup solutions to be deployed as applications grow in size over time. This requires that any current backup and recovery implementations either be discarded or be radically changed. Accordingly, embodiments of the EBR management network system 10 may be implemented to provide a scalable path from a current generation backup and recovery model to a future generation backup and recovery model while using the same backup software. This also includes using the physical tape equipment of one model that can be reconfigured to be used in another model.

In other embodiments of the present invention, the EBR management network system 10 provides centralized control of a business enterprise's backup and recovery services over conventional backup and recovery techniques. One of the many embodiments of the EBR management network system 10 according to the present invention is based on managing and operating the business enterprise backup and recovery function from a central location and permitting a lesser specialized work force to manage all aspects of the backup or recovery task.

Although conventional backup and recovery, disaster recovery, and records retention systems are managed as a single unit differentiated by retention periods and offsite schedules, one of many embodiments of the EBR management network system 10 according to the present invention provides an approach to backup and recovery, disaster recovery, and records retention in which each of these functions may be strictly defined and managed independently. One of many embodiments of such an EBR management network system 10 provides reliable and consistent results. Further, one of many embodiments of the EBR management network system 10 provides strategic disaster recovery and records retention processes so as to be able to fully support the backup and recovery needs of a business enterprise.

Embodiments of the EBR management network system 10 may be implemented to operate under various computer platforms and/or operating systems such as UNIX, LINUX, Intel Platforms, and others, for example. Other embodiments of the EBR management network system 10 utilize technologies associated with S-390 Mainframe environments, for example. Such environments may include an ESCON connection rather than a Fiber Channel SAN. Embodiments of the EBR management network system 10 also are implemented to operate under software applications such as UCC-1 provided by Computer Associates as well as software utilities applications such as IEBCOPY, IEBGENER, and FDR provided by IBM, for example.

The EBR management network system 10 infrastructure is implemented in a modular form to address the ever growing demands for information backup and recovery services in business enterprises. As application information expands and requirements for storage and backup on a 24-hour, 7-days per week basis, become more common, conventional approaches to backup and recovery may fail to meet the application's expectations and current business needs. The EBR management network system 10 infrastructure provides a close integration between hardware and software to assure minimum interruption of current applications during backup and during most recoveries. Hardware components include consolidated storage elements, BCVs, Fiber Channel hubs and switches, robotic tape processing elements and high-speed tape transports. Software capabilities in backup and recovery may be interfaced with Oracle hot backup interfaces and EMC Symmetrix software to provide enhanced application availability, for example.

In one of many embodiments of the present invention, the EBR management network system 10 infrastructure comprises a master backup server that includes a fail-over system and a server that drives the tape robotics. Furthermore, the access hubs and switches are generally configured with redundant capability. In one of many embodiments of the present invention, the EBR networks 12, 14, 16, 18 each also comprise a local area network (LAN) that includes a central switch connected to a layer of 10/100 switches. The switch can be a Nortel switch, for example. In one of various embodiments of the present invention, the EBR networks 12, 14, 16, 18 each utilize multiple power sources and power supplies and hot swappable components where possible. In general, applications include redundancy where it is required by eliminating single points of failure and thus minimizing the need to perform emergency recovery from tapes. Furthermore, any of the following embodiments described herein utilizing an access hub 56 (see FIG. 5, for example), can be implemented utilizing a fabric switch 90 (see FIG. 10, for example).

In one of many embodiments of the present invention, the EBR management network system 10 provides functionality at each of the EBR networks 12, 14, 16, 18. Media servers, tape robotics, and tape transports as well as SAN functionality are generally supported in a WAN context across extended distances. The EBR management network system 10 infrastructure maintains application information within each of the EBR networks 12, 14, 16, 18, for example.

In one of many embodiments of the present invention, the EBR management network system 10 infrastructure provides a modular and shared backup and recovery infrastructure for each of the EBR network 12, 14, 16, 18 at Data Centers1-4, respectively, and provides: (1) Backup and recovery services for applications involving over 200 gigabytes of data; (2) Secure network division for applications requiring secure network connectivity; (3) Relief for existing overburdened backup and recovery network infrastructure within a business enterprise; (4) Integration with BTSI standard architectural hardware and software components including SANs, secure domain network architecture, and business enterprise database; (5) Modular growth capacity; (6) Business enterprise backup and recovery tools; and (7) Centralized backup recovery management capability, for example.

In one of many embodiments of the present invention, the EBR management network system 10 infrastructure comprises hardware components that provide design extensibility as SAN technology matures. For example, the EBR networks 12, 14, 16, 18 can provide fully switched SANs and SAN protocols over TCP/IP.

The various embodiments of the EBR management network system 10 according to the present invention provide business enterprises with modular growth capability. Current estimates state that information storage rates are growing at roughly 60% each year. Thus, a scalable infrastructure such as the EBR management network system 10 becomes a way of maintaining a functional backup and recovery infrastructure for the business enterprise.

The EBR management network system 10 infrastructure according to various embodiments of the present invention comprises shared use of hardware and common software interfaces between the various EBR networks 12, 14, 16, 18 of the EBR management network system 10. The shared approach provides an efficient use of capital investment and maximizes operational expertise over time for the business enterprise. The various models or implementations comprising the EBR networks 12, 14, 16, 18 act as cooperative components to provide overall backup and recovery services for an entire business enterprise. For example, the network based models can support up to 2,648 clients and can communicate with the clients over 10/100 Mb and GigE channels, for example. The server-free based models can support up to 396 clients, for example, and include media servers, EMC BCVs, Brocade Fiber Channel edge switches, tape drives and tape media, fiber channel infrastructure, and various other network components. The base infrastructure provides master and shared media servers, Brocade FC core switches, fiber channel infrastructure, silos, tape drives and tape media, Veritas software, ASM software, LSI disk arrays, and Nortel network switches. The GigE based models also include media servers (e.g., Sun 280R/480R/V880), EMC BCVs, Brocade Fiber Channel edge switches, tape drives and tape media, fiber channel infrastructure, and various other network components.

The various systems cooperate to achieve EBR services across the EBR management network system 10 and provide offsite tape services, remote tape vaulting services, backup and recovery services, and hierarchical storage management. The offsite tape services can provide a capacity of 400 TB of vaulted data per month, for example, and supports data recovery as well as long term data retention. The offsite tape data recovery can be prioritized based on business requirements using, for example, a 10 day retention standard and achieve a recovery point objective of 24 hours. The backup has no impact to the application and can be implemented using Veritas software, for example. The remote tape vaulting can provide a capacity of 85 TB of vaulted data per month. This service supports data recovery and a recovery time objective of 24-48 hours and a recovery point objective of 24 hours. The remote tape vaulting avoids media handling, leverages the OC3 access circuits, and extends the fiber channel SAN. Backup and recovery services provide a capacity of 1,800 TB of backup data per month. The system can fully recover file, database, or system data within 8 hours and includes a 60 day retention, for example. The backup and recovery services can be implemented with Veritas NetBackup DataCenter software, for example, that integrates with database utilities (e.g, SQL-BackTrack, Oracle RMON, and the like), and also integrates with data movers (e.g., EMC TimeFinder, SDRF, and the like). The overall applied system service also includes hierarchical storage management (HSM) with a capacity of up to 15 TB of managed data per month and also supports backup and recovery operations. The data is backed up to a disk pool (e.g., using NetBackup software) to provide increased efficiency over tape drive/media. The HRM service also utilizes ASM software provided by StorageTek, for example. The HRM service also supports data recovery with a recovery time objective of 24-48 hours and a recovery point objective of 24 hours. The service also provides remote disk-to-disk and disk-to-tape capability, leverages the OC3 network, and extends the fiber channel SAN. The way that these various systems act as cooperative components will now be discussed in further detail below.

As discussed in further detail below, the EBR networks 12, 14, 16, 18 of the EBR management network system 10 infrastructure also can provide network and/or LAN backup capability via GigE connections to media servers or master servers. Application servers are interconnected using 10/100 TCP/IP interfaces into locally distributed network switches at each EBR network 12, 14, 16, 18. Direct attached or LAN-Free backup capability is provided for application servers that require direct attached tape drives to the application server. These application servers become backup and recovery media servers. The media server is the EBR network 12, 14, 16, 18 component that provides the EBR management network system 10 infrastructure with its modular growth capability. The media servers accommodate increases in application or information backup and recovery demands. They also provide the EBR networks 12, 14, 16, 18 with the benefit of the additional CPU and back-plane resources necessary for managing a growing number of input/output (I/O) devices.

In one of many embodiments of the present invention, the EBR networks 12, 14, 16, 18 provide LAN backup capabilities via a GigE hub. The various embodiments of the LAN-Free dedicated tape backup model and the LAN-Free shared tape backup model are supported via a media server component where the media server often performs the roles of application server and of media server. Access by the LAN-Free shared tape backup model is made available by a connection to an access hub such as an STK Access Hub, for example. The application Server-Free backup embodiment of the present invention provides backup and recovery data movement without using processing cycles on the application server and is facilitated by the EBR network's 12, 14, 16, 18 master server.

Figure 2:
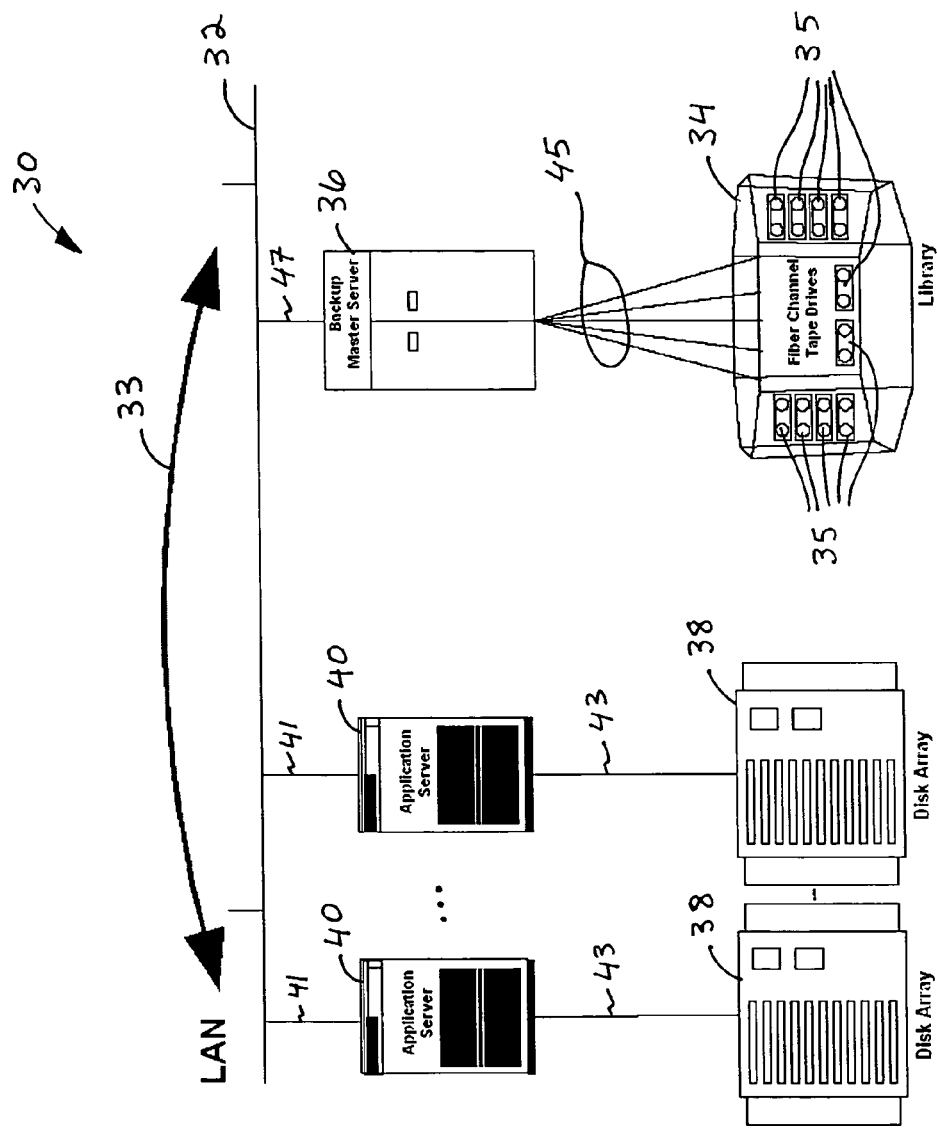
FIG. 2 illustrates one embodiment of a LAN network system.

The various backup and recovery models that comprise the EBR networks 12, 14, 16, 18 at the various Data-Centers 1-4, respectively, act as cooperative components of the overall EBR management network system 10 and are discussed below in further. Accordingly, FIG. 2 illustrates one of many embodiments of a LAN network system 30 for applications requiring backup and recovery of less than 200 GB of information. Embodiments of the present invention utilizing the LAN network system 30 address applications where the servers contain less than 200 Gigabytes of useable storage. This provides an efficient backup mechanism for small and medium-sized applications. The LAN network system 30 may be utilized by any one of the many embodiments of the EBR networks 12, 14, 16, 18 according to the present invention. The LAN network system 30 comprises a local area network 32 (e.g., LAN), which in one embodiment is a TCP/IP Ethernet LAN, for example. The system 30 comprises a common path 33 for carrying both control signals and application data across the LAN 32. The system 30 also comprises one or more application server(s) 40 and a backup master server 36 in communication with the LAN 32. The backup master server 36 is in communication with the LAN 32 via a gigabit (e.g., GigE) connection 47 and the application server(s) 40 is in communication with the LAN 32 via 10/100 connection(s) 41, for example. The LAN network system 30 also comprises one or more disk arrays 38 in communication with the one or more application server(s) 40 via one or more fiber channel(s) 43, for example. The LAN network system 30 also comprises a tape backup library 34 that includes one or more tape drives 35. The tape backup library 34 is in communication with and is controlled by the backup master server 36 via one or more fiber channels 45. In one of many embodiments of the LAN network system 30, the tape backup library 34 is a 9310 STK Library comprising 9840 Fiber Channel Tape Drives provided by StorageTek, Inc.

For applications that require more than 200 GB of storage, the architecture of the LAN network system 30 requires the addition of mechanisms for removing the data path from the LAN 32. One way of removing the data path from the LAN 32 is to utilize, for example, a SAN, which is described in detail below. Following are descriptions of additional embodiments of modular build-out backup and recovery models that may be used as a basis for implementing any one of the EBR networks 12, 14, 16, 18 in each of the Data Centers-1-4, for example. These modular build-out backup and recovery models comprise systems that employ different configurations based upon the information backup and recovery size. Furthermore, the particular configuration that is ultimately employed in any one of the EBR networks 12, 14, 16, 18 generally will depend on the specific hardware configurations used by a given application.

A large-scale version of the LAN networked embodiment will be referred to herein as the LAN network GigE model, described below with reference to FIG. 3. Embodiments of the present invention utilizing the LAN based GigE backup model utilize one or more application media servers, which may be network attached to an EBR GigE LAN, for example. The GigE model also may utilize one or more application servers that are GigE attached to an EBR network, for example. The GigE model embodiments fit applications in the 200 GB to 500 GB range and, in certain circumstances, may be used for applications with up to 1.5 TB (Tera Bytes) of usable storage space. Applications such as SQL Backtrack can be used to assist with database backup synchronization and to minimize application outage exposure, for example.

Figure 3:
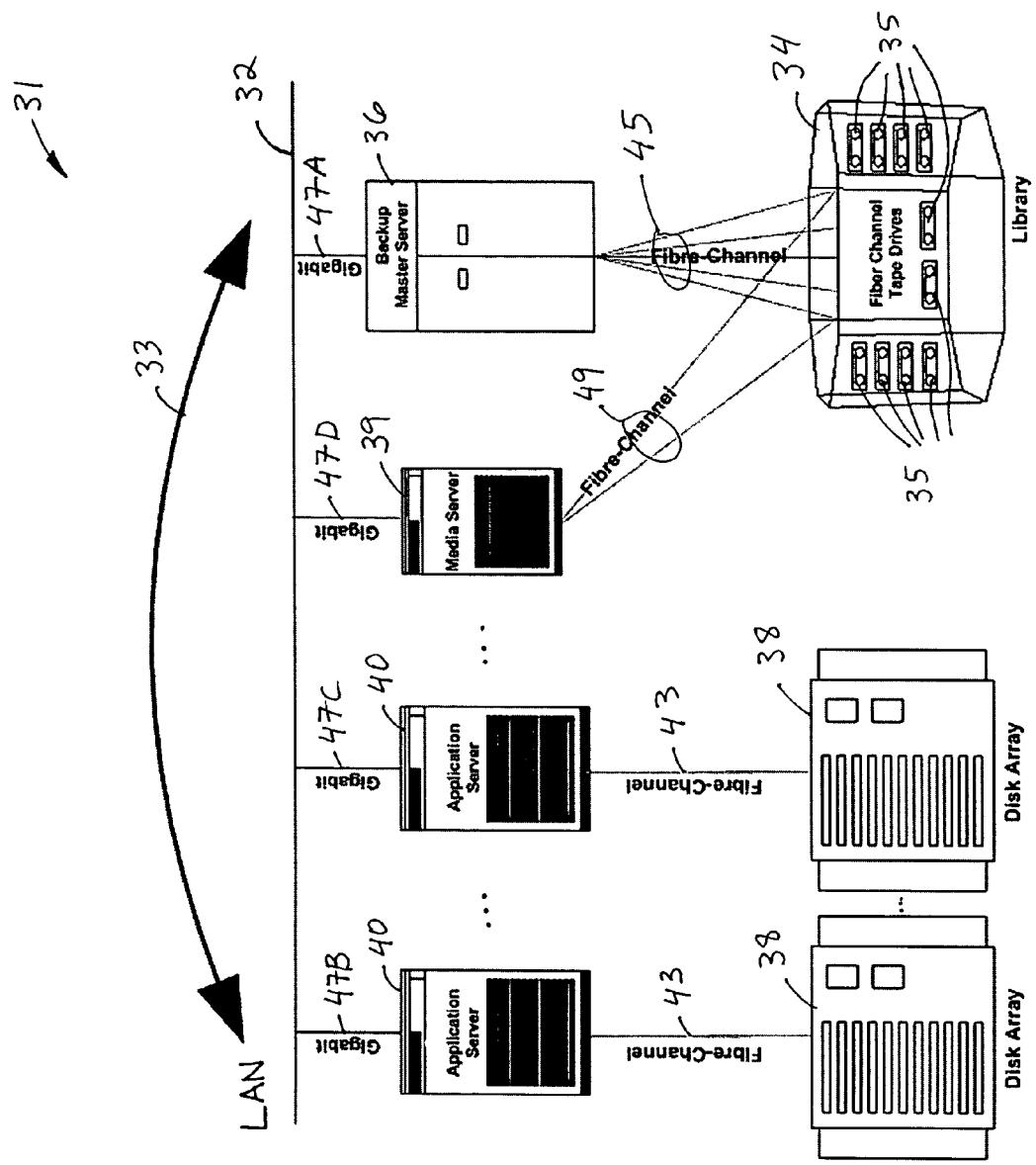
FIG. 3 illustrates one embodiment of a LAN network GigE system.

FIG. 3 illustrates one of many embodiments of a LAN network GigE system 31 for applications requiring backup and recovery of information in the 500 GB to 1.5 TB range. The LAN network GigE system 31 may be utilized by any one of the many embodiments of the EBR networks 12, 14, 16, 18 according to the present invention. The LAN network GigE system 31 comprises a LAN 32, which in one embodiment is a TCP/IP Ethernet LAN, for example. The system 31 comprises a common path 33 for carrying both control signals and application data across the LAN 32. The system 31 also comprises one or more application server(s) 40, a media server 39, and backup master server 36. The application server(s) 40, the media server 39, and the backup master server 36 are all in communication with the LAN 32 via gigabit connections 47A, B, C, D. The master server 36 also is in communication with the LAN 32 via a gigabit connection 47A. The one or more application server(s) 40 are in communication with the LAN 32 via gigabit connection(s) 47C, D. The media server 39 is in communication with the LAN 32 via a gigabit connection 47D. The LAN network GigE system 31 also comprises one or more disk arrays 38 in communication with the one or more application server(s) 40 via one or more fiber channel(s) 43. The LAN network GigE system 31 also comprises a tape backup library 34 comprising one or more tape drives 35. The tape backup library 34 is in communication with the master server 36 via one or more fiber channels 45. The tape backup library 34 also is in communication with the media server 39 via one or more fiber channels 49. In one of many embodiments of the LAN network GigE system 31, the tape backup library 34 is a 9310 STK Library comprising 9840 Fiber Channel Tape Drives provided by StorageTek, Inc.

Embodiments of the present invention employing the LAN-Free model utilize one or more application servers to implement backup and recovery operations to locally attached tape devices, for example. If an application includes "low-use" windows during each day, then the LAN-Free embodiments may provide high-speed capability for addressing backup and recovery operations without the additional expense of employing one or more media servers.

Figure 4:
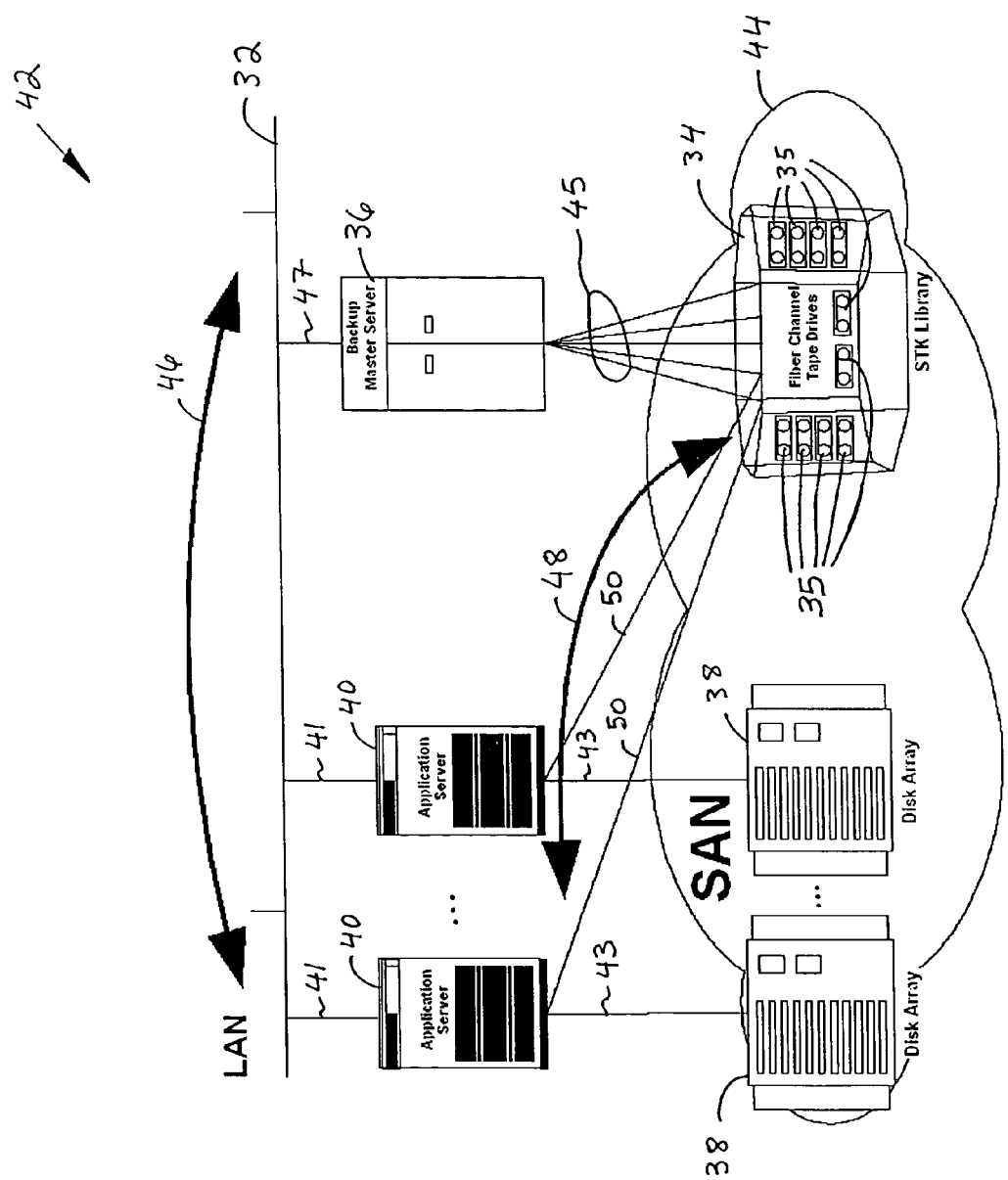
FIG. 4 illustrates one embodiment of a LAN-Free dedicated tape drive system.

FIG. 4 illustrates one of many embodiments of a LAN-Free dedicated tape drive system 42 employing a SAN 34 for performing information backup and recovery operations. The LAN-Free dedicated tape drive system 30 may be utilized by any one of the many embodiments of the EBR networks 12, 14, 16, 18 according to the present invention. The LAN-Free dedicated tape drive system 42 comprises a LAN 32, which in one embodiment, is a TCP/IP Ethernet LAN, for example. The system 42 provides a control path 46 across the LAN 32 and a data path 48 separate from the LAN 32. The separate data path 48 provides a communication path between the server(s) 40 and the tape backup library 34 via one or more fiber channels 50, for example. This implementation option may be employed with various kinds of disk storage device(s) 38 attached to the application server(s) 40. Embodiments of this particular implementation employ the application server(s) 40 host CPU cycles to move data associated with backup or recovery operations and utilizes the dedicated tape drives 35 in the tape backup library 34 that are in communication with the application server 40 via the fiber channel, for example. The master server 36 is in communication with the LAN 32 via a gigabit connection 47 and the application server(s) 40 are in communication with the LAN 32 via 10/100 connection(s) 41, for example. The disk arrays 38 are in communication with the one or more application servers 40 via one or more fiber channel(s) 43, for example. The backup master server 36 controls the movement of information in and out of the tape backup library 34.

Figure 5:
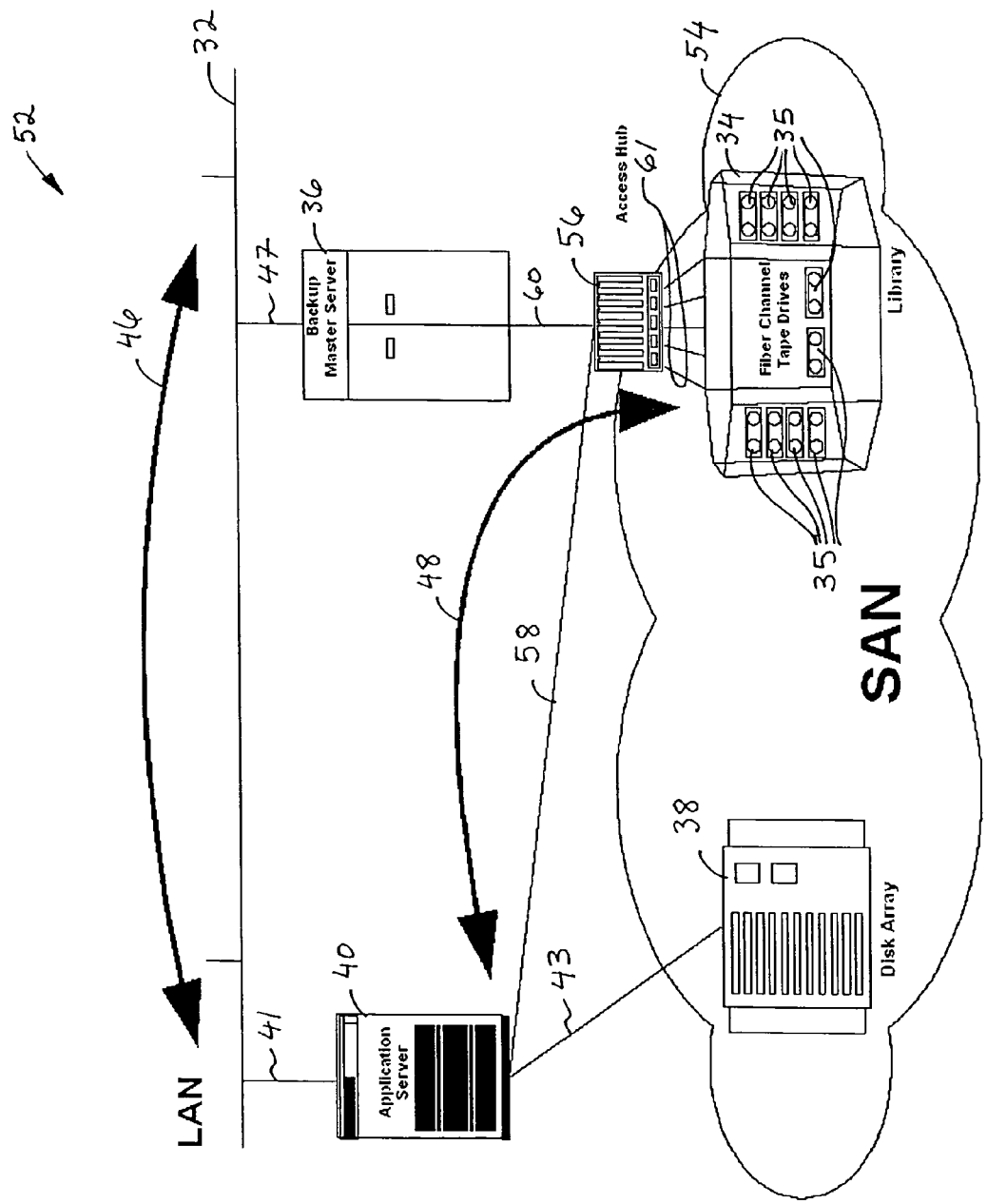
FIG. 5 illustrates one embodiment of a LAN-Free shared drive system.

FIG. 5 illustrates one of many embodiments of a LAN-Free shared drive system 52 employing a SAN 34 data movement technique for backup and recovery operations that allows sharing of the tape drives 35 between the application server 40 and the backup master server 36. The application server 40 and the backup master server 36 are in communication with the LAN 32. The backup master server 36 is in communication with the LAN 32 via a gigabit connection 47 and the application server 40 is in communication with the LAN 32 via 10/100 connection 41, for example. The application server 40 is in communication with the disk array 38 via a fiber communication channel 43, for example. The LAN-Free shared tape drive system 52 also provides a control path 46 across the LAN 32 and a separate data path 48 removed from the LAN 32. The separate data path 48 provides a communication path between the application server 40 and the tape backup library 34 across a fiber communication channel 58 through a tape access hub 56, for example. The tape access hub 56 and the SAN 54 allow the tape drives 35 in the tape backup library 34 to be shared between multiple hosts such as the application server 40 and the backup master server 36, via the fiber communication channel 58 and the communication channel 60, respectively, for example. The tape access hub 56 is in communication with the tape backup library 34 via fiber communication channels 61. In one of many embodiments of the present invention the tape access hub 56 is an STK StorageNet Access Hub provided by StorageTek, Inc. This simulates having directly attached tape drives 35 on the application server 40, for example. The ability of having the application server 40 and the master server 36 share the tape drives 35 allows the EBR networks 12, 14, 16, 18 according to the present invention to utilize any idle time associated with the tape drives 35.

Embodiments of the present invention utilizing the Server-Free backup and recovery model include one or more media servers and one or more Business Continuance Volumes (BCVs). Such Server-Free models may be used, for example, to address the most challenging backup requirements both in terms of the amount of data required to be backed up and the reduction of backup and recovery interference with the application. The server-free backup and recovery model capability does not require the use of an application server. The server-free backup model offloads the application servers from the burden of backup and recovery overhead and frees up CPU, memory, and IO back-plane resources. This process provides more predictable application response times and a more efficient division of processing loads between servers.

Figure 6:
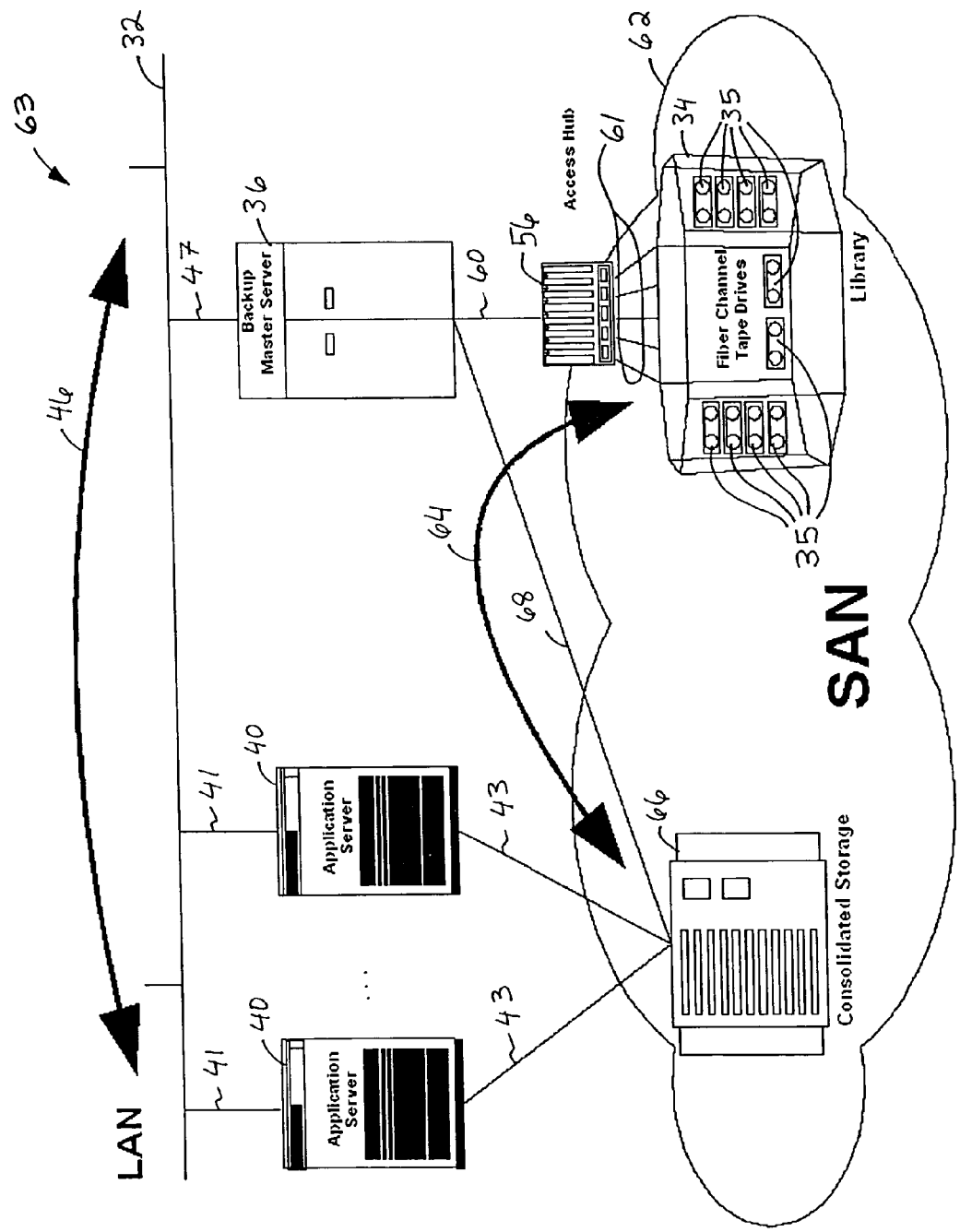
FIG. 6 illustrates one embodiment of a Server-Free backup system.

FIG. 6 illustrates one of many embodiments of a Server-Free backup system 63 employing a SAN 62 data movement technique for backup and recovery operations. The Server-Free backup system 63 comprises one or more application server(s) 40 and a backup master server 36 in communication with the LAN 32. The application server(s) 40 is in communication with the LAN 32 via 10/100 connection(s) 41, and the backup master server 36 is in communication with the LAN 32 via a gigabit connection 47, for example. The application server(s) 40 also is in communication with a consolidated disk storage array 66 via the fiber channels 43, for example. The consolidated disk storage array 66 is in communication with the backup master server 36 and the tape backup library 34 via a tape access hub 56. In one of many embodiments of the present invention, the consolidated disk storage array 66 is, for example, an EMC consolidated storage array, which provides storage capacities greater than 200 GBs. The backup master server 36 also is in communication with the tape access hub 56 through a communication channel 60. The tape access hub 56 is in communication with the tape backup library 34 through fiber communication channels 61. The Server-Free backup system 60 also provides separate control paths 46 and data paths 64. The control path 46 goes across the LAN 32 while the data path 64 is separate from the LAN 32 and goes through the backup server(s) 40 across the fiber communication channels 43, 68. The separate data path 64 provides a communication channel between the consolidated disk storage array 66 and the tape backup library 34 across the fiber communication channel 68 through the tape access hub 56, for example. The Server-Free backup system 60 removes the data path 64 from the LAN 32 and places it in the SAN 62. The data path 64 also is routed completely away from the application server(s) 40 so that they no longer require the capacity for handling the movement of data associated with backup or recovery.

The EBR management network system 10 infrastructure according to various embodiments of the present invention provides a modular, scalable, and manageable infrastructure for a total storage management solution that grows as technology advances. Those skilled in the art will appreciate that data is a key to a business enterprise's competitive advantage. The EBR management network system 10 infrastructure's role is to protect the business enterprise's data and provide efficient data movement within a storage hierarchy.

The implementation of the EBR management network system 10 according to various embodiments of the present invention requires the implementation of backup and recovery schemes discussed above with respect to FIGS. 2-6 (e.g, systems 30, 31, 42, 52, 63) in the various EBR networks 12, 14, 16, 18 of the EBR management network system 10. The implementation requires, for example, media servers, tape transports, and LAN capabilities. The implementations in the various EBR networks 12, 14, 16, 18 are based on, for example, Fiber Channel Arbitrated Loop (FC-AL) technology and a full Fabric-Switched SAN (switched SAN). The implementation of the switched SAN technology also comprises the deployment of additional Brocade switches or STK tape directors in each of the EBR networks 12, 14, 16, 18 to reduce any potentially unacceptable risks associated with the switched SAN technology. The Fiber Channel Switch "E-port," can be utilized between the tape and the disk switches to provide full SAN capability and to allow additional flexibility in the Server-Free backup system 63 employing the SAN 62 implementation. Furthermore, the implementation of the EBR management network system 10 will require Archival/Hierarchical Storage Management (HSM) and SAN management software.

The EBR management network system 10 according to one of many embodiments of the present invention also includes a SAN over TCP/IP. The EBR management network system 10 infrastructure provides gigabit connectivity in the EBR servers to provide WAN data movement or network-based disaster recovery capability. Disk arrays providing virtual tape capabilities also can be utilized in the SAN as high-speed buffers for the tape transports. The tape transport implementations also include high-speed drives and high-density drives.

Figure 7:
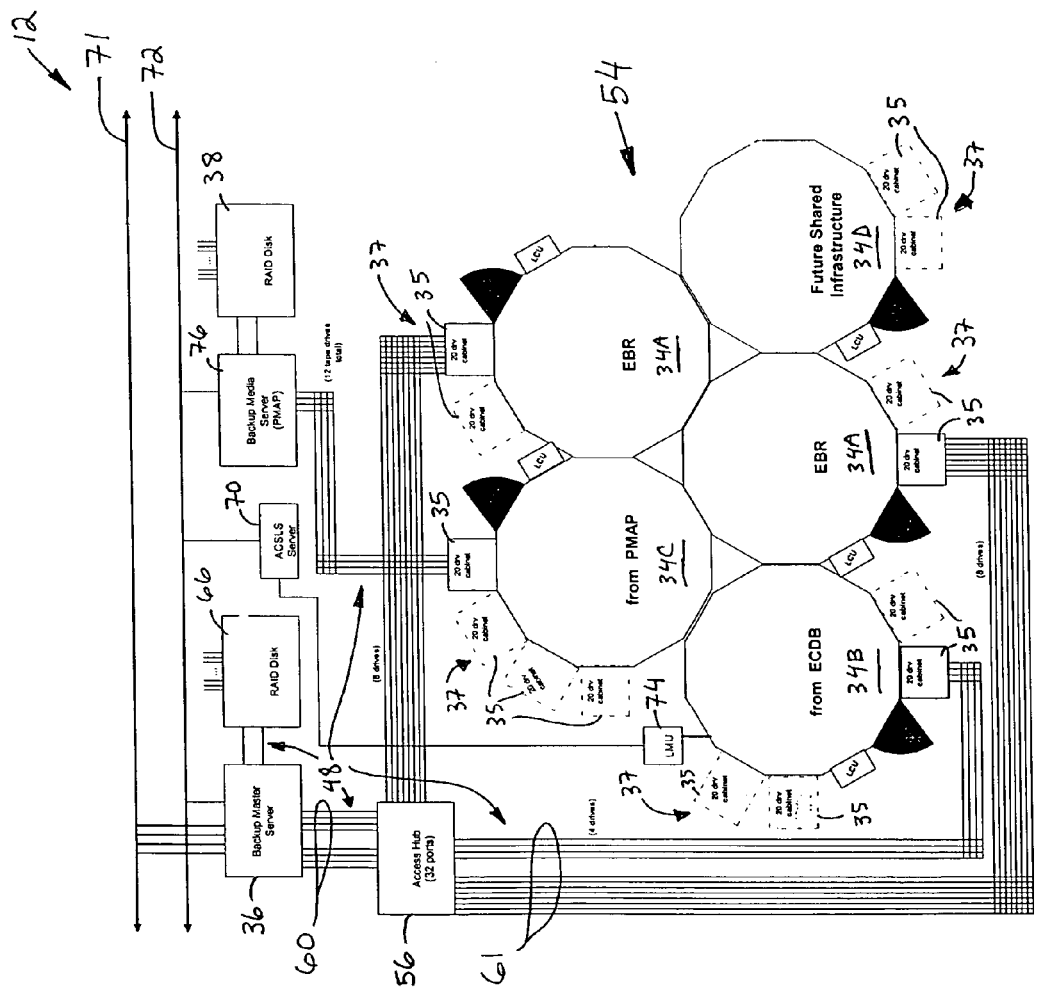
FIG. 7 illustrates one embodiment of a high level overview of an EBR network for a first data center.

FIG. 7 illustrates a high level overview of the EBR network 12 for Data Center-1. The EBR network 12 comprises one or more integrated EBR tape libraries 34A, an ECDB tape backup library 34B, a PMAP tape backup library 34C, and a future shared infrastructure tape backup library 34D, for example. The network capabilities at the EBR network 12 are implemented with a secure domain. Thus, the implementation of the EBR network 12 at Data Center-1 provides secure network connectivity for applications over 200 Gigabytes.

The EBR network 12 at Data Center-1 component of the EBR management network system 10 infrastructure is based on standard Over-The-Network LAN backup 30, LAN-Free backup 42, 52, and Server-Free backup 60 architectures described previously (e.g., see FIGS. 2-6) using the tape libraries 34A-D and the tape drives 35. The EBR network 12 comprises a backup network 71, which in one embodiment is a TCP/IP network for backup and recovery services. The EBR network 12 also comprises a user network 72, which in one embodiment is a TCP/IP intranet network for internal business enterprise use such as the Bell South Open System Interconnect Platform (BOSIP). The EBR network 12 also comprises a backup master server 36 in communication with the backup network 71, the user network 72, a consolidated disk storage array 66 via bus adapter cards, and a tape access hub via fiber channels 60. The tape access hub 56 is in communication with the tape drives 35 in the tape libraries 34A-D via fiber channels 61, thus providing communication access and control of the tape libraries 34A-D to the backup master server 36. These connections form the "data path" 48 from the consolidated disk storage array 66 through the backup master server 36 to the tape drives 35. These connections also form the "data path" to business continuance volumes, such as, for example, EMC Business Continuance Volumes (BCVs). The tape drives 35 are generally housed in twenty of the sixty drive slots available in drive bays 37 in communication with the tape libraries 34A-D. In one of many embodiments of the present invention the backup master server 36 is an E6500 server provided by Sun, Inc., the tape access hub 56 is an STK StorageNet Access Hub provided by StorageTek, Inc., and the bus adapter cards are JNI 1063 Host Bus Adapter cards, for example. In one of many embodiments of the present invention, the tape libraries 34A-D comprise five STK 9310 Powderhorn silos with twenty fiber channel attached 9840 tape drives 35 provided by StorageTek, Inc., for example. In one of many embodiments of the present invention, the drive bays 37 are STK 9741 drive bays installed in the STK 9310 Powderhorn silos, for example.

A server 70 also is utilized to run the tape backup library's 34 automated cartridge system library software (ACSLS), for example. In one of many embodiments of the present invention, the ACSLS server 70 receives control signals for the user network 72 from the backup master server 36 for mounting the tapes within the silo of the tape backup library 34. The ACSLS server 70 sends the control signal to the Library Management Unit 74 (LMU) for robotic positioning within the silo. In one of many embodiments of the present invention, the ACSLS server 70 is a Sun Ultra 10 server, for example.

The EBR network 12 backup master server 36 in Data Center-1 is the master backup platform for the EBR network 12. In one of many embodiments of the present invention, the backup master server 36 components include, for example, an E6500 platform with five CPU/Memory boards and 8 I/O boards. The server 36 includes ten 400 MHz/8 MB UltraS- PARCs processors provided by Sun, Inc. and 10 GB of memory. The server 36 also includes two D1000s each with three 18.2 GB 10,000 RPM drives for storage. Drive 1 is for Boot/OS/Swap/NetBackup/NetWorker Binaries, and Drives 2 and 3 are for NetBackup/NetWorker Indexes/Database for mirroring between trays. The backup master server 36 also includes, for example, two SBus Adapters such as Ultra Differential F/W Intelligent SCSI Adapters, ten JNI FC1063 Host Bus Adapters, and four IEEE 802.3z Gigabit Ethernet Adapters. The backup master server 36 is set up for networking, where each I/O board comprises one Fast-Ethernet interface for a total of eight 10/100 interfaces and four IEEE 802.3z Gigabit interfaces used for network backups. Software components include Solaris 8, Veritas NetBackup Server 3.2, Veritas Volume Manager 3.0.4, and Veritas File System 3.3.3, for example.

The tape libraries 34A-D include components such as, for example, tape drives 35 that reside in an STK 9310 silo that is part of the EBR network 12 infrastructure. The tape libraries 34 include additional components, such as, for example, StorageTek 9840 FC Tape Drives for 9310 Powderhorn Silos, STK 9310 Powderhorn Silos, STK Optical Channel cables, STK Optical Channel cables, JNI Networks Fiber Channel Host Bus Adapters for Sun S-Bus, JNI Networks Fiber Channel Host Bus Adapters for Sun S-Bus (for 16 new tape drives), 500-9840 20 GB Tape Cartridges, 9840 Cleaning Tapes, Veritas/Legato Tape Drive Support for NetBackup/NetWorker, Sun Ultra 10 server and STK ACSLS software/license, STK StorageNet Access Hub (16 ports), STK 9741 Drive Cabinets, and Veritas/Legato NetBackup/NetWorker Master Software plus 25-unit client license pack.

The EBR network's 12 SAN 54 in Data Center-1 comprises the tape libraries 34A-D, the consolidated disk array 66, and the tape access hub 56. The SAN 54 also includes fiber channel arbitrated loop (FC-AL) technology. The tape access hub 56 is the SAN 54 component that allows sharing of tape drives 35. The tape access hub 56 can be realized with a 32-port STK StorageNet Access Hub provided by StorageTek, for example. The EBR tape backup library 34A and the ECDB tape backup library 34B connections from the backup master server 36 to the tape access hub 56 comprises, for example, eight Jaycor HBA's and eight Fiber Channel runs to the access hub 56. Each of the twenty 9480 tape drives 35 designed for the EBR tape libraries 34A and the ECDB tape backup library 34B comprise a Fiber Channel run from the tape transport to the tape access hub 56. Additional media servers 76 connecting to the tape access hub 56 can be configured to share any of the twenty available tape drives 35.

The tape access hub 56 is configured into two FC-AL loops. The top eight ports form a single loop and are allocated for use by the EBR backup master server 36. The bottom 24 ports form the second loop. Having two loops reduces the ability of sharing the tape drives 35 because they can be shared only within the same loop. Nevertheless, all devices within a given loop are limited to sharing the bandwidth of that loop (100 MBytes/sec). Having two loops provides for the partitioning of a high-demand application onto one of the loops where it will not compete for bandwidth with applications on the other loop. This is a software configuration that can be changed at any time.

Figure 8:
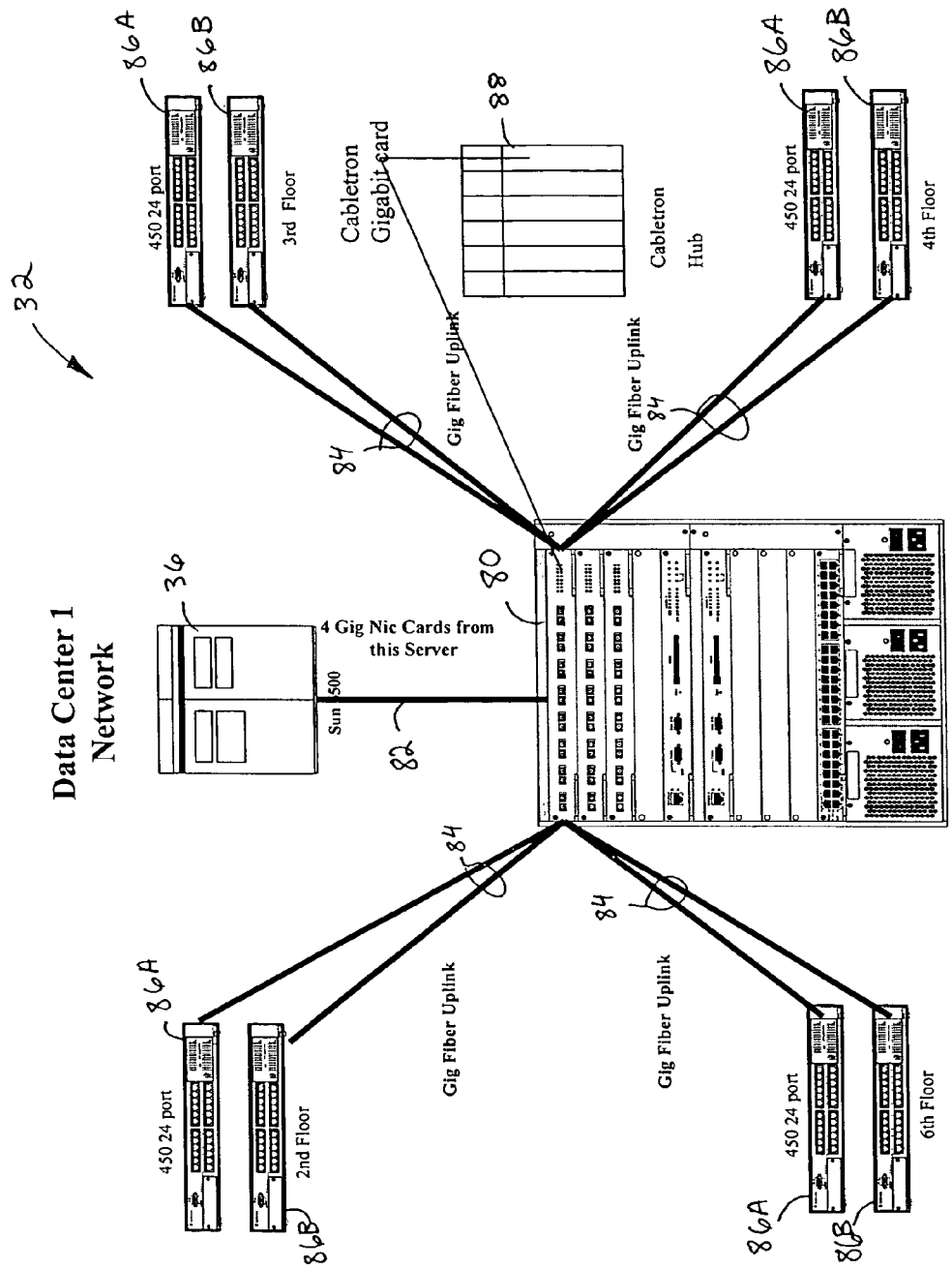
FIG. 8 illustrates one embodiment of a LAN portion of the EBR network.

FIG. 8 illustrates one of many embodiments of a LAN 32 portion of the EBR network 12 in Data Center-1. The LAN 32 incorporates both backup and recovery processes for secure (110.x.x.x) and non-secure network segments (55.x.x.x). The LAN 32 comprises a routing switch 80. In one of many embodiments of the present invention the routing switch 80 is, for example, a Nortel 8600 gigabit switch. Four Gigabit connections 82 are provided from the routing switch 80 to the EBR backup master server 36 that provide the LAN 32 with a bandwidth for LAN backup and recovery clients. The LAN 32 also comprises Gigabit fiber uplink connections 84 from the routing switch 80 to a plurality of pairs of port switches 86A, B. In one of many embodiments of the present invention, the pairs of port switches 86A, B are Nortel 450 24-port switches that provide connectivity points for a plurality of LAN 32 clients. The LAN 32 clients are connected, for example, using category five 10/100 TCP/IP copper connections to the port switches 86. Each connection to the pairs of port switches 86A, B comprises a secure connection to a first port switch 86A and a non-secure connection to a second port switch 86B, for example. The pairs of port switches 86A, B are utilized on a floor quadrant in the Data Center-1. Security is provided via physical separation at the point of connection and by VLAN software running inside the switch 80. Both connections terminate/originate with the EBR backup master server 36, which is security hardened.

Other systems can be incorporated with the LAN 32 using a migration path and a network Gigabit interface card 88 such as, for example, an Ethernet interface Gigabit card for a Cabletron Hub providing DCI backup and recovery client access. The network interface Gigabit card 88 is connected to the routing switch 80 (e.g., the Nortel 8600) in order to provide a network migration path. This network migration path provides connectivity, but not additional throughput. The network migration path allows for minimum changes to the applications while providing access to REEL-Backup Servers for recovery processes using existing backups while new backups can be obtained via the EBR backup master server 36. CAM/MMA servers can transition to other backup and recovery infrastructures by moving existing TCP/IP connections from the MMA/BOSIP user network 72 to a secure backup and recovery network port switch 86A or a non-secure backup and recovery network port switch 86B (e.g., the Nortel 450) ports. With a server connection for the user network 72 and a server connection for the Backup and Recovery LAN 32, the backup and recovery LAN 32 connection can be homed to the EBR LAN 32 and the user network 72 connection can be used to retrieve existing recovery data from CAM/MMA. This provides a non-disruptive transition from the existing network backups to the EBR network 12.

The components comprising the LAN 32 in the Data Center-1 include hardware components such as an 8600 gigabit routing switch, three power supplies, CPU, memory, four eight port gigabit routing switch modules, one 48 port 10/100 switching interface module, and 24 450-24T Switches, for example. The software component includes a Passport 8600 Enterprise Routing Switch Software License (Ver. 3.0.1), for example.

Figure 9:
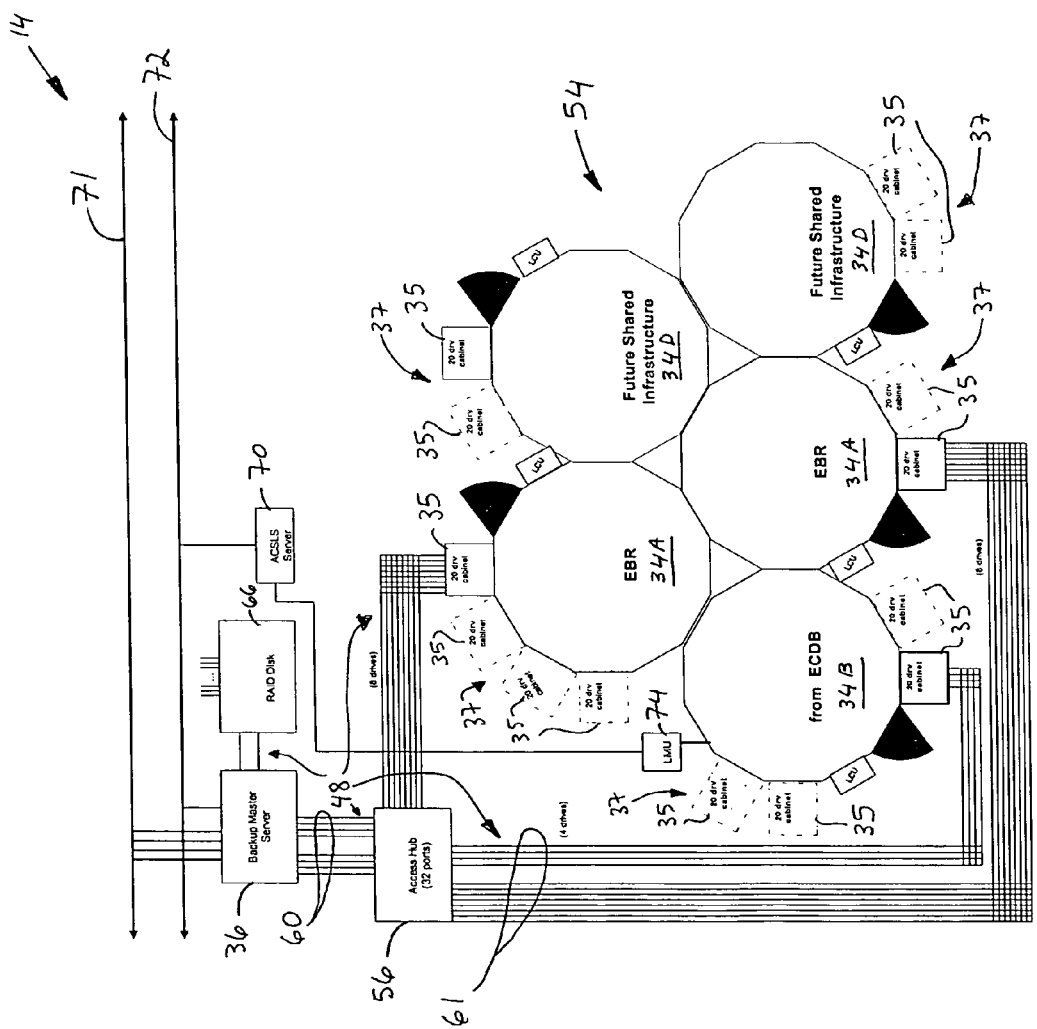
FIG. 9 illustrates one embodiment of a high level overview of an EBR network for a second data center.

FIG. 9 illustrates a high level overview of the EBR network 14 for Data Center-2. The EBR network 14 comprises one or more integrated EBR tape libraries 34A, an ECDB tape backup library 34B, and one or more future shared infrastructure tape libraries 34D. As described previously with respect to the EBR network 12 of Data Center-1, the network capabilities at the EBR network 12 are implemented with a secure domain. Thus, the implementation of the EBR network 14 at Data Center-2 also provides secure network connectivity for applications with greater than 200 gigabytes. One role for Data Center-2 component of the EBR management network system 10 is to relieve the existing LAN 32 backup and recovery solutions and to provide a solution for applications with greater than 200 Gigabytes.

The EBR network 14 at the Data Center-2 component of the EBR management network system 10 is based on a standard Over-The-Network LAN backup 30, LAN-Free backup 42, 52, and Server-Free backup 60 architectures described previously (e.g., see FIGS. 2-6) using the tape libraries 34A, B, D and the tape drives 35. The EBR network 14 also comprises a backup network 71 and user network 72. The EBR network 14 also comprises a backup master server 36 in communication with the backup network 71, the user network 72, a consolidated disk storage array 66 via bus adapter cards, and a tape access hub 56 via fiber channels 60. The tape access hub 56 is in communication with the tape drives 35 of the tape libraries 34A, B, D via fiber channels 61, thus providing communication access and control of the tape libraries 34A, B, D to the backup master server 36. These connections form the "data path" 48 from the consolidated disk storage array 66 through the backup master server 36 to the tape drives 35. These connections also form the "data path" to business continuance volumes such as, for example, EMC BCVs. The tape drives 35 are generally housed in twenty of the sixty drive slots available in drive bays 37 in communication with the tape libraries 34A, B, D. In one of many embodiments of the present invention the backup master server 36 is an E6500 server provided by Sun, Inc., the tape access hub 56 is an STK StorageNet Access Hub provided by StorageTek, Inc., and the bus adapter cards are JNI 1063 Host Bus Adapter cards, for example. In one of many embodiments of the present invention, the tape libraries 34A, B, D comprise five STK 9310 Powderhorn silos with twenty fiber channels attached 9840 tape drives 35 provided by StorageTek, Inc., for example. In one of many embodiments of the present invention, the drive bays 37 are STK 9741 drive bays installed in the STK 9310 Powderhorn silos, for example. In one of many embodiments of the present invention the backup master server 36 is an E6500 server provided by Sun, Inc., the tape access hub 56 is an STK StorageNet Access Hub provided by StorageTek, Inc., and the bus adapter cards are JNI 1063 Host Bus Adapter cards, for example. In one of many embodiments of the present invention, the tape libraries 34A-D comprise five STK 9310 Powderhorn silos with twenty fiber channels attached 9840 tape drives 35 provided by StorageTek, Inc., for example. In one of many embodiments of the present invention, the drive bays 37 are STK 9741 drive bays installed in the STK 9310 Powderhorn silos, for example.

An ACSLS server 70 also is utilized to run the tape backup library automated cartridge system library software (AC-SLS), for example. In one of many embodiments of the present invention, the ACSLS server 70 is a Sun Ultra 10 server, for example. The ACSLS server 70 receives control signals for the user network 72 from the backup master server 36 for mounting the tapes within the tape backup library 34 silo. The ACSLS server 70 sends the control signal to the LMU 74 for robotic positioning within the silo. In one of many embodiments of the present invention, the ACSLS server 70 is a Sun Ultra 10 server, for example.

The EBR backup master server 36 in Data Center-2 is the master backup platform for the EBR network 14. In one of many embodiments of the present invention, the EBR backup master server 36 includes an E6500 platform with five CPU/Memory boards and eight I/O boards. The server 36 includes ten 400 MHz/8 MB UltraSPARCs processors provided by Sun, Inc. and 10 GB of memory. The EBR backup master server 36 also includes two D1000s each with 3 18.2 GB 10,000 RPM drives for storage. Drive 1 is for Boot/OS/Swap/NetBackup/NetWorker Binaries, and Drives 2 and 3 are for NetBackup/NetWorker Indexes/Database for mirroring between trays. The EBR backup master server 36 also includes two SBus Adapters such as, for example, Ultra Differential F/W Intelligent SCSI Adapters, ten JNI FC1063 Host Bus Adapters, and four IEEE 802.3z Gigabit Ethernet Adapters. The EBR backup master server 36 is set up for networking, where each I/O board comprises one FastEthernet interface for a total of eight 10/100 interfaces and four IEEE 802.3z Gigabit interfaces used for network backups. Software components include Solaris 8, Veritas NetBackup Server 3.2, Veritas Volume Manager 3.0.4, and Veritas File System 3.3.3, for example.

The tape libraries 34A, B, D components include, for example, tape drives 35 that reside in an STK 9310 silo that is part of the EBR network 14 infrastructure. The components for implementing the tape libraries 34A, B, D include, for example, StorageTek 9840 FC Tape Drives for 9310 Powderhorn Silos, STK 9310 Powderhorn Silos, STK Optical Channel cables, STK Optical Channel cables, JNI Networks Fiber Channel Host Bus Adapters for Sun S-Bus, JNI Networks Fiber Channel Host Bus Adapters for Sun S-Bus (for 16 new tape drives), 500-9840 20 GB Tape Cartridges, 9840 Cleaning Tapes, Veritas/Legato Tape Drive Support for NetBackup/NetWorker, Sun Ultra 10 server and STK ACSLS software/license, STK StorageNet Access Hub (16 ports), STK 9741 Drive Cabinets, and Veritas/Legato NetBackup/NetWorker Master Software plus 25-unit client license pack.

The EBR network's 14 SAN 54 at Data Center-2 comprises, for example, FC-AL technology. The SAN 54 component for sharing is the tape access hub 56, which can be realized with a 32-port STK StorageNet Access Hub, for example. The EBR tape backup library 34A and the ECDB tape backup library 34B connections from the master server 36 to the tape access hub 56 comprise, for example, 8 Jaycor HBA's and 8 Fiber Channel runs to the tape access hub 56. Each of the twenty 9480 tape drives 35 designed for the EBR tape libraries 34A and the ECDB tape backup library 34B comprise a Fiber Channel run from the tape transport to the tape access hub 56. Additional media servers 76 connecting to the tape access hub 56 can be configured to share any of the twenty available tape drives 35.

The tape access hub 56 is configured into two FC-AL loops. The top eight ports form a single loop and are allocated for use by the EBR backup master server 36. The bottom 24 ports form the second loop. Although having two loops reduces the ability of sharing the tape drives 35 because they can be shared only within the same loop, all devices within a given loop are limited to sharing the bandwidth of that loop (100 MBytes/sec). Having two loops provides for the partitioning of a high-demand application onto one of the loops where it will not compete for bandwidth with applications on the other loop. This is a software configuration that can be changed at any time.

Figure 10:
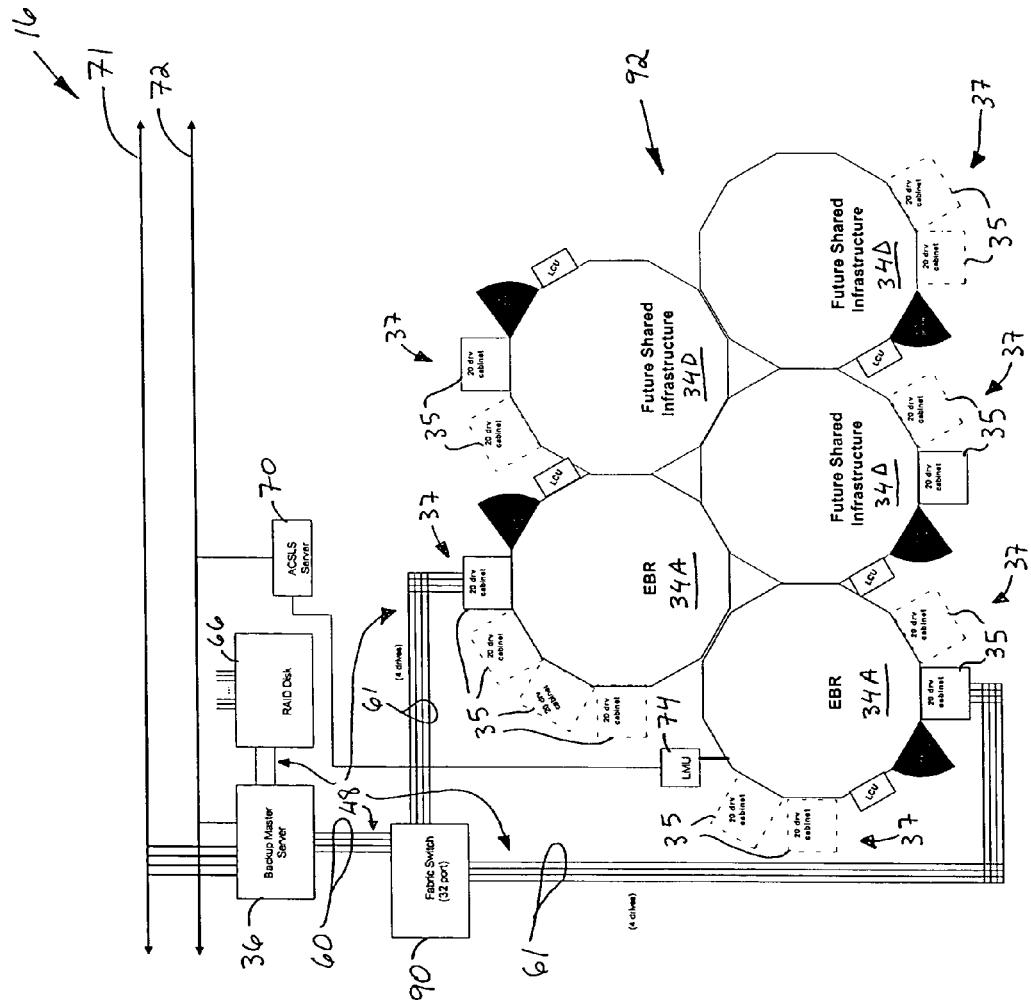
FIG. 10 illustrates one embodiment of a high level overview of an EBR network for a third data center.

FIG. 10 illustrates a high level overview of the EBR network 16 for Data Center-3. The EBR network 16 comprises one or more integrated EBR tape libraries 34A, and one or more future shared infrastructure tape libraries 34D. As described previously with respect to the EBR network 16 of Data Center-1, the network capabilities at the EBR network 16 are implemented with a secure domain. Thus, the implementation of the EBR network 16 at Data Center-3 also provides secure network connectivity. The EBR network 16 at Data Center-3 also provides an EBR backup master server 36, tape libraries 34A, D, tape transports 37, a fabric switch 90, and local area network switches (not shown). The EBR network 16 at Data Center-3 also provides backup and recovery services for applications moving to the facility and utilizes a fully switched fabric SAN 92.

The EBR network 16 at Data Center-3 also is based on a standard Over-The-Network LAN backup 30, LAN-free backup 42, 52, and Server-free backup 60 architectures described previously (e.g., see FIGS. 2-6) using the tape libraries 34A, D and the tape drives 35. The EBR network 14 also comprises a backup network 71 and user network 72. The EBR network 14 also comprises an EBR backup master server 36 in communication with the backup network 71, the user network 72, a consolidated disk storage array 66 via bus adapter cards, and a fabric switch 90 via communication channels 60. The fabric switch 90 is in communication with the tape drives 35 of the tape libraries 34A, D via fiber channels 61, thus providing communication access and control of the tape libraries 34A, D to the backup master server 36. These connections form the "data path" 48 from the consolidated disk storage array 66 through the backup master server 36 to the tape drives 35. These connections also form the "data path" to business continuance volumes, such as, for example, EMC BCVs. The tape drives 35 are generally housed in twenty of the sixty drive slots available in drive bays 37 in communication with the tape libraries 34A, D. In one of many embodiments of the present invention the EBR backup master server 36 is an E6500 server provided by Sun, Inc., the tape access hub 56 is an STK StorageNet Access Hub provided by StorageTek, Inc., and the bus adapter cards are JNI 1063 Host Bus Adapter cards, for example. In one of many embodiments of the present invention, the tape libraries 34A-D comprise five STK 9310 Powderhorn silos with twenty fiber channel attached 9840 tape drives 35 provided by StorageTek, Inc., for example. In one of many embodiments of the present invention, the drive bays 37 are STK 9741 drive bays installed in the STK 9310 Powderhorn silos, for example. In one of many embodiments of the present invention, the tape libraries 34A, D comprise one or more STK 9310 Powderhorn silos, for example, having eight Fiber Channel attached 9840 tape drives 35. The tape drives 35 are generally housed in drive slots available in the STK 9741 drive bays 37 that are installed in the STK 9310 silos. The tape drives 35 are in communication with backup master server 36 (e.g., an E6500) via fiber channel cables, a fabric switch 90 such as, for example, a Brocade Silkworm 2800 Fabric Switch, and a plurality of bus adapter cards (not shown). The backup master server 36 also is in communication with the disk array 38 via bus adapter cards. In one of many embodiments of the present invention, the disk array 38 is an EMC Symmetrix storage array via four JNI 1063 Host Bus Adapter cards, for example.

An ACSLS server 70 also is utilized to run the tape backup library ACSLS software, for example. In one of many embodiments of the present invention, the ACSLS server 70 is a Sun Ultra 10 server, for example. The ACSLS server 70 receives, via the TCP/IP network 72, the control signals from the backup master server 36 for mounting the tapes within the tape backup library 34 silo. The ACSLS server 70 sends the control signal to the STK Library Management Unit 74 (LMU) for robotic positioning within the silo.

The EBR network 16 backup master server 36 in Data Center-3 is the master backup platform for the EBR management network system 10. In one of many embodiments of the present invention, the backup master server 36 includes an E6500 platform with five CPU/Memory boards and 8 I/O boards. The server 36 includes ten 400 MHz/8 MB UltraS-PARCs processors provided by Sun, Inc. and 10 GB of memory. The server 36 also includes two D1000s each with 3 18.2 GB 10,000 RPM drives for storage. Drive 1 is for Boot/OS/Swap/NetBackup/NetWorker Binaries, and Drives 2 and 3 are for NetBackup/NetWorker Indexes/Database for mirroring between trays. The server 36 also includes two SBus Adapters such as, for example, Ultra Differential F/W Intelligent SCSI Adapters, ten JNI FC1063 Host Bus Adapters, and four IEEE 802.3z Gigabit Ethernet Adapters. The server 36 is set up for networking, where each I/O board comprises one FastEthernet interface for a total of eight 10/100 interfaces and four IEEE 802.3z Gigabit interfaces used for network backups. Software components include Solaris 8, Veritas NetBackup Server 3.2, Veritas Volume Manager 3.0.4, and Veritas File System 3.3.3, for example.

The tape libraries 34A, D include, for example, tape drives 35 that reside in an STK 9310 silo that is part of the EBR management network system 10 infrastructure. The components for implementing the tape libraries 34A, D include, for example, StorageTek 9840 FC Tape Drives for 9310 Powderhorn Silos, STK 9310 Powderhorn Silos, STK Optical Channel cables, STK Optical Channel cables, JNI Networks Fiber Channel Host Bus Adapters for Sun S-Bus, JNI Networks Fiber Channel Host Bus Adapters for Sun S-Bus (for 16 new tape drives), 500-9840 20 GB Tape Cartridges, 9840 Cleaning Tapes, Veritas/Legato Tape Drive Support for NetBackup/NetWorker, Sun Ultra 10 server and STK ACSLS software/license, Brocade Silkworm 2800 Fabric Switches, STK 9741 Drive Cabinets, and Veritas/Legato NetBackup/NetWorker Master Software plus 25-unit client license pack.

The EBR network's SAN 92 at Data Center-3 comprises, for example, FC-AL technology. The SAN 92 component for sharing is the fabric switch 90, which can be realized with two 16-port Brocade Silkworm Switches, for example. Thus, additional media servers connecting to the fabric switch 90 can be configured to share any of the available tape drives 35.

Figure 11:
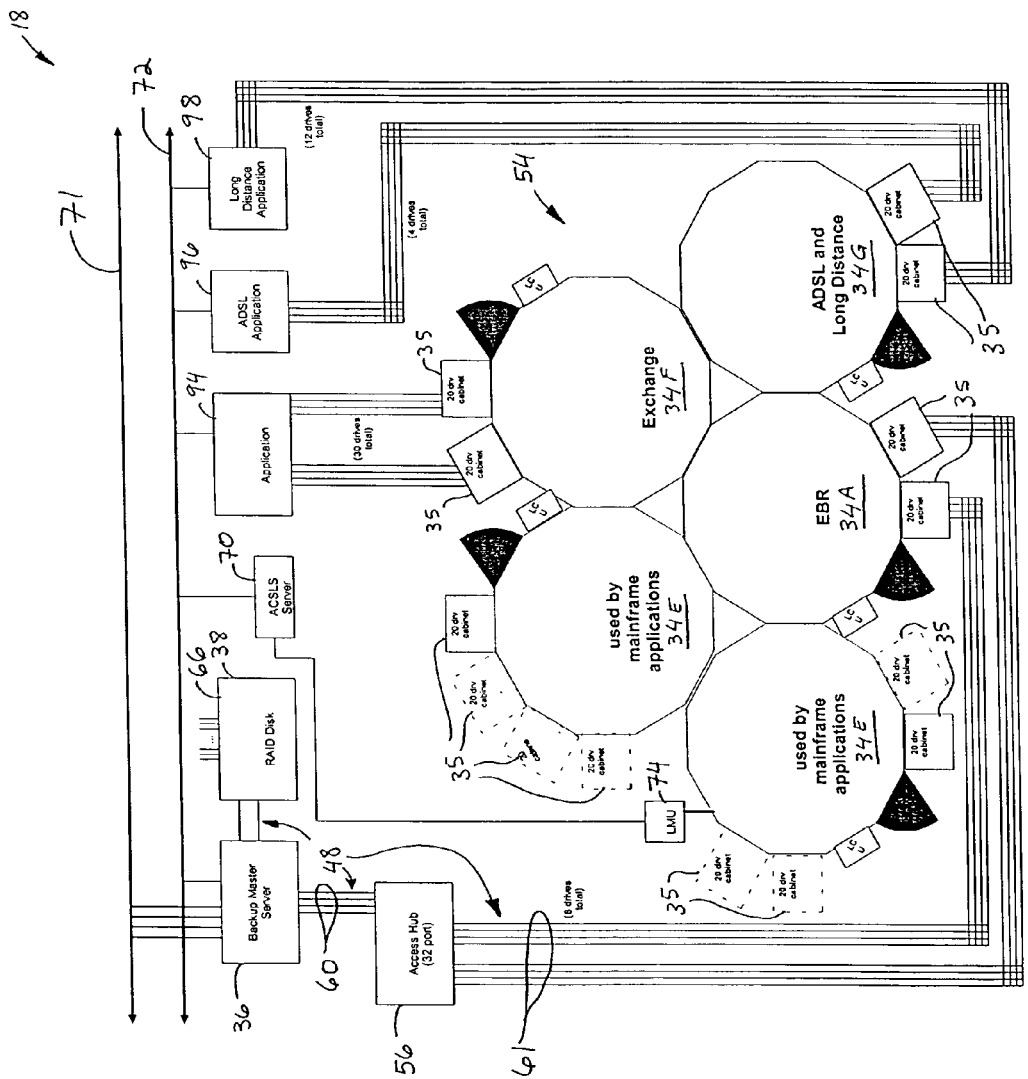
FIG. 11 illustrates one embodiment of a high level overview of an EBR network for a fourth data center.

FIG. 11 illustrates a high level overview of the EBR network 18 for Data Center-4. The EBR network 18 comprises one or more integrated EBR tape libraries 34A, one or more mainframe application libraries 34E, Application library 34F, and an ADSL and long distance library 34G. As described previously with respect to the EBR network 14 of Data Center-1, the network capabilities at the EBR network 12 are implemented with a secure domain. Thus, the implementation of the EBR network 18 at Data Center-4 also provides secure network connectivity.

The EBR network 18 at the Data Center-4 is based on a standard Over-The-Network LAN backup 30, LAN-free backup 42, 52, and Server-Free backup 60 architecture described previously (e.g., see FIGS. 2-6) using the tape libraries 34A, E, F, G and the tape drives 35. The EBR network 14 also comprises a backup network 71 and user network 72. The EBR network 14 also comprises a backup master server 36 in communication with the backup network 71, the user network 72, a consolidated disk storage array 66 via bus adapter cards, and a tape access hub 56 via fiber channels 60. The tape access hub 56 is in communication with the tape drives 35 of the tape libraries 34A, E, F, G via fiber channels 61, thus providing communication access and control of the tape libraries 34A, E, F, G to the backup master server 36. These connections form the "data path" 48 from the consolidated disk storage array 66 through the backup master server 36 to the tape drives 35. These connections also form the "data path" to business continuance volumes, such as, for example, EMC Business Continuance Volumes (BCVs). The tape drives 35 are generally housed in twenty of the sixty drive slots available in drive bays 37 in communication with the tape libraries 34A, E, F, G. In one of many embodiments of the present invention the backup master server 36 is an E6500 server provided by Sun, Inc., the tape access hub 56 is an STK StorageNet Access Hub provided by StorageTek, Inc., and the bus adapter cards are JNI 1063 Host Bus Adapter cards, for example. In one of many embodiments of the present invention, the tape backup library 34 comprises an STK 9310 Powderhorn silo with eight Fiber Channel attached 9840 tape drives, for example. The tape drives 35 are generally housed in eight of the forty drive slots available in the drive bays 37 in communication with the tape backup library 34. In one of many embodiments of the present invention, the drive bays 37 are STK 9741 drive bays installed in the two STK 9310 silos. The tape drives 35 are in communication with the backup master server 36 via fiber channel cables, the tape access hub 56, and a plurality of host bus adapter cards (not shown), for example. In one of many embodiments of the present invention the backup master server 36 is an E6500 server provided by Sun, Inc., the tape access hub 56 is an STK StorageNet Access Hub, and the adapter cards are JNI 1063 Host Bus Adapter cards, for example. The backup master server 36 also is in communication with the disk array 38 via bus adapter cards. In one of many embodiments of the present invention, the disk array 38 is an EMC Symmetrix storage array and is in communication with the four JNI 1063 Host Bus Adapter cards, for example.

An ACSLS server 70 also is utilized to run the tape backup library ACSLS software, for example. In one of many embodiments of the present invention, the ACSLS server 70 is a Sun Ultra 10 server, for example. The ACSLS server 70 receives via the TCP/IP network 72 the control signals from the backup master server 36 for mounting the tapes within the tape backup library 34 silo. The ACSLS server 70 sends the control signal to the STK LMU 74 for robotic positioning within the silo.

The EBR backup master server 36 in Data Center-4 is the master backup for the EBR network 18. In one of many embodiments of the present invention, the backup master server 36 includes an E6500 platform with five CPU/Memory boards and 8 I/O boards. The server 36 includes ten 400 MHz/8 MB UltraSPARCs processors provided by Sun, Inc. and 10 GB of memory. The server 36 also includes two D1000s each with three 18.2 GB 10,000 RPM drives for storage. Drive 1 is for Boot/OS/Swap/NetBackup/NetWorker Binaries, and Drives 2 and 3 are for NetBackup/NetWorker Indexes/Database for mirroring between trays. The server 36 also includes two SBus Adapters such as, for example, Ultra Differential F/W Intelligent SCSI Adapters, ten JNI FC1063 Host Bus Adapters, and four IEEE 802.3z Gigabit Ethernet Adapters. The server 36 is set up for networking, where each I/O board comprises one FastEthernet interface for a total of eight 10/100 interfaces and four IEEE 802.3z Gigabit interfaces used for network backups. Software components include Solaris 8, Veritas NetBackup Server 3.2, Veritas Volume Manager 3.0.4, and Veritas File System 3.3.3, for example.

The tape libraries 34A, E, F, G include, for example, tape drives 35 that reside in an STK 9310 silo that is part of the EBR management network system 10 infrastructure. The components for implementing the tape backup library 34 include, for example, StorageTek 9840 FC Tape Drives for 9310 Powderhorn Silos, STK 9310 Powderhorn Silos, STK Optical Channel cables, STK Optical Channel cables, JNI Networks Fiber Channel Host Bus Adapters for Sun S-Bus, JNI Networks Fiber Channel Host Bus Adapters for Sun S-Bus (for 16 new tape drives), 500-9840 20 GB Tape Cartridges, 9840 Cleaning Tapes, Veritas/Legato Tape Drive Support for NetBackup/NetWorker, Sun Ultra 10 server and STK ACSLS software/license, STK StorageNet Access Hub (16 ports), STK 9741 Drive Cabinets, and Veritas/Legato NetBackup/NetWorker Master Software plus 25-unit client license pack.

The EBR network's 18 SAN 54 at Data Center-4 comprises, for example, fiber channel arbitrated loop (FC-AL) technology. The SAN 54 component for sharing is the tape access hub 56, which can be realized with a 32-port STK StorageNet Access Hub, for example. The EBR tape backup library 34A and the ECDB tape backup library 34B connections from the master server 36 to the tape access hub 56 comprises for example, four Jaycor HBA's and four Fiber Channel runs to the tape access hub 56, for example. Each of the eight STK 9480 tape drives 35 designed for the EBR tape libraries 34A, E, F, G comprise a Fiber Channel run from the tape transport to the tape access hub 56. Additional media servers 76 connecting to the tape access hub 56 can be configured to share any of the twenty available tape drives 35.

The tape access hub 56 is configured into two FC-AL loops. The top eight ports form a single loop and are allocated for use by the EBR backup master server 36. The bottom 24 ports form the second loop. Having two loops reduces the ability to share the tape drives 35 because they can be shared only within the same loop. Nevertheless, all devices within a given loop are limited to sharing the bandwidth of that loop (100 MBytes/sec). Having two loops provides for the partitioning of a high-demand application onto one of the loops where it will not compete for bandwidth with applications on the other loop. This is a software configuration that can be changed at any time.

The EBR network 18 at Data Center-4 also comprises an application server 94 such as, for example, a Microsoft Exchange Application, in communication with the user network 72 and with the tape backup library 34F. The EBR network 18 also comprises an ADSL application 96 with the ADSL and Long Distance tape backup library 34G. Also, the EBR network 18 comprises a long distance application 98 in communication with the user network and the ADSL and Long Distance tape backup library 34G.

The LAN 32 portions of the EBR networks 14, 16, 18 at Data Center-2, Data Center-3, and Data Center-4, respectively, comprise similar hardware and software implementation as that described with respect to the LAN 32 in EBR network 12 in the Data Center-1. Therefore, reference is made to FIG. 7 and the corresponding description for a description of one of many embodiments of the LAN 32 at EBR networks 14, 16, 18 at Data Center-2, Data Center-3, and Data Center-4, respectively.

Figure 12:
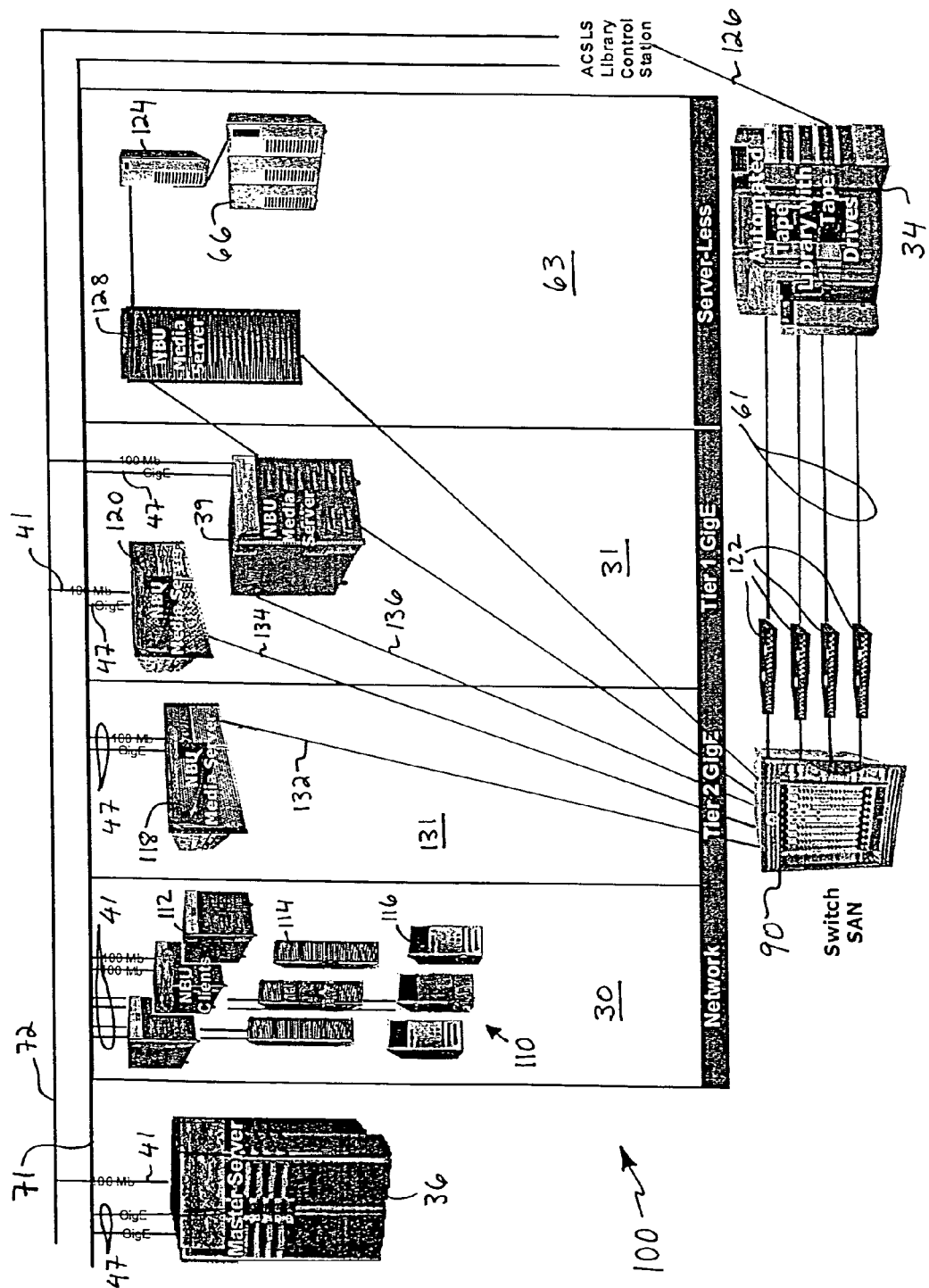
FIG. 12 illustrates another embodiment of an EBR system.

FIG. 12 illustrates one of many embodiments of an EBR system 100. The EBR system 100 comprises a backup network 71 and a user network 72 for interconnecting a LAN network based system 30, a LAN based GigE systems 31, 131 (e.g., Tier 1 and Tier 2 systems), and a Server-free system 63. The various systems 30, 31, 131, 63 cooperate to implement the overall EBR process. The system 100 comprises the backup master server 36 such as, for example, a Sun NetBackup server, which is the highest level backup management server controlling and coordinating the backup activities of the various systems 30, 31, 131, 63. The EBR backup master server 36 is in communication with the backup network 71 over one or more GigE communication channels 47, and is in communication with the user network 72 via 100 Mb communication channel 41. The EBR backup master server 36 controls the overall backup activity and acts as backup scheduler determining what, when, where, and who needs to be backed up. The EBR backup master server 36 also hosts a master catalog of all backups performed by the system 100.

The LAN network based system 30 comprises a plurality of network backup (NBU) clients 110 in communication with the backup network 71. In one of many embodiments of the present invention, the NBU clients 110 include Solaris 112, HP 114, and Windows 116, for example. The NBU clients 110 comprise client software and are configured to communicate with the EBR backup master server 36. The NBU clients 110 also communicate via the 100 Mb communication channel 41

(e.g., 100 Mb Ethernet backup network 71 connection) to a specific NBU media server 39, 118, 120, 128, and the like.

The Tier 1 LAN based GigE system 31 comprises a plurality of NBU media servers 39, 120, for example, with Gigabit (GigE) backup network 71 connectivity via the GigE channels 47, and are in communication with the user network 72 via 100 Mb communication channels 41. The Tier 1 LAN based GigE system 31 provides a data backup capacity of between 200 GB and 1.5 TB, for example, and does not require a BCV. In one of many embodiments of the present invention the NBU media server 39 is a Sun Fire V880 Solaris NBU Media Server provided by Sun and the other NBU media server 120 is a Sun Fire 480 Solaris NBU Media Server also provided by Sun, for example. Further, the media servers 39, 120 use SQL BackTrack software as well as media server software, for example. The NBU media servers 39, 120 also provide fiber channel connectivity to the tape backup library 34 and perform the backup to the fiber channel tape drives of the tape backup library 34. The NBU media servers 39, 120 also are configured to back up project servers connected to the backup network 71 and/or the user network 72. The NBU media server 39 is in communication with the EBR SAN fabric switch 90 via a fiber channel 136 and the NBU media server 120 is in communication with the SAN fabric switch 90 via a fiber channel 134, for example. In one of many embodiments of the present invention, the EBR SAN fabric switch 90 is a Brocade Silkworm 2800 fabric switch. The EBR SAN fabric switch 90 is in communication with the tape backup library 34, which in one of many embodiments of the present invention is an STK Automated Tape backup library with 9840 Tape Drives, for example. The connection between the EBR SAN fabric switch 90 and the tape backup library 34 is formed through hardware units 122 via fiber channels 61, for example. The tape backup library 34 receives SCSI robotic control signals from the ACSLS library control station, for example, which is in communication with the backup network 71 and the user network 72.

The Tier 2 LAN based GigE system 131 comprises at least one NBU media server 118, for example, with Gigabit (GigE) backup network 71 connectivity via the GigE channels 47, and is in communication with the user network 72 via a 100 Mb communication channel 41. The Tier 2 LAN based GigE system 131 provides a data backup capacity of between 200 GB and 500 GB, for example, and does not require a BCV. In one of many embodiments of the present invention the NBU media server 118 is a Sun Fire 280R Solaris NBU Media Server provided by Sun, for example. Further, the media server 118 uses SQL BackTrack software as well media server software, for example. The NBU media server 118 also provides fiber channel connectivity to the tape backup library 34 and performs the backup to the fiber channel tape drives of the tape backup library 34. The NBU media server 118 also is configured to backup project servers connected to the backup network 71 and/or the user network 72. The NBU media server 118 with the EBR SAN fabric switch 90 via a fiber channel 132, for example. As discussed previously, the EBR SAN fabric switch 90 is in communication with the tape backup library 34 through hardware units 122 via fiber channels 61, for example.

The Server-Free based system 63 comprises one or more NBU media servers 128, for example, with Gigabit (GigE) network backup connectivity. The Server-Free based system 63 performs the Import/Mount function of application BCV device groups. In one of many embodiments of the present invention the NBU media server 128 is a Solaris NBU Media Server provided by Sun, and the NBU media server 130 is an HP NBU Media Server provided by Hewlett-Packard, for example. Further, the media servers 128, 130 also include media server software, for example. The NBU media servers 128, 130 provide fiber channel connectivity to a disk storage array 66 such as, for example the EMC Symmetrix storage system via the switch 124 which is, for example, an EMC Connectrix multi-port departmental switch that provides the connectivity and expandability to construct a networked storage infrastructure. The NBU media servers 128, 130 also provide fiber channel connectivity to the tape backup library 34 and performs the backup to the fiber channel tape drives of the tape backup library 34. The NBU media servers 128, 130 also are configured to back up project's servers. The NBU media servers 128, 130 also are in communication with the EBR SAN fabric switch 90 via a fiber channel 138, 140, respectively, for example. As discussed previously, the EBR SAN fabric switch 90 is in communication with the tape backup library 34 through hardware units 122 via fiber channels 61, for example.

Embodiments of the present invention utilizing the ASM technique or model provide a hierarchical storage management (HSM) approach for open systems. Such HSM systems provide the ability to manage information over different storage media such as disk, tape, optical, and the like, from various storage locations. Embodiments of the present invention utilizing the ASM model enables information from applications running in separate data centers to be written first to a local disk pool and then to a local tape, for example. The data is then replicated via fiber channel over an ATM network to another disk pool in yet another separate data center containing a storage tape backup library, for example.

Figure 13:
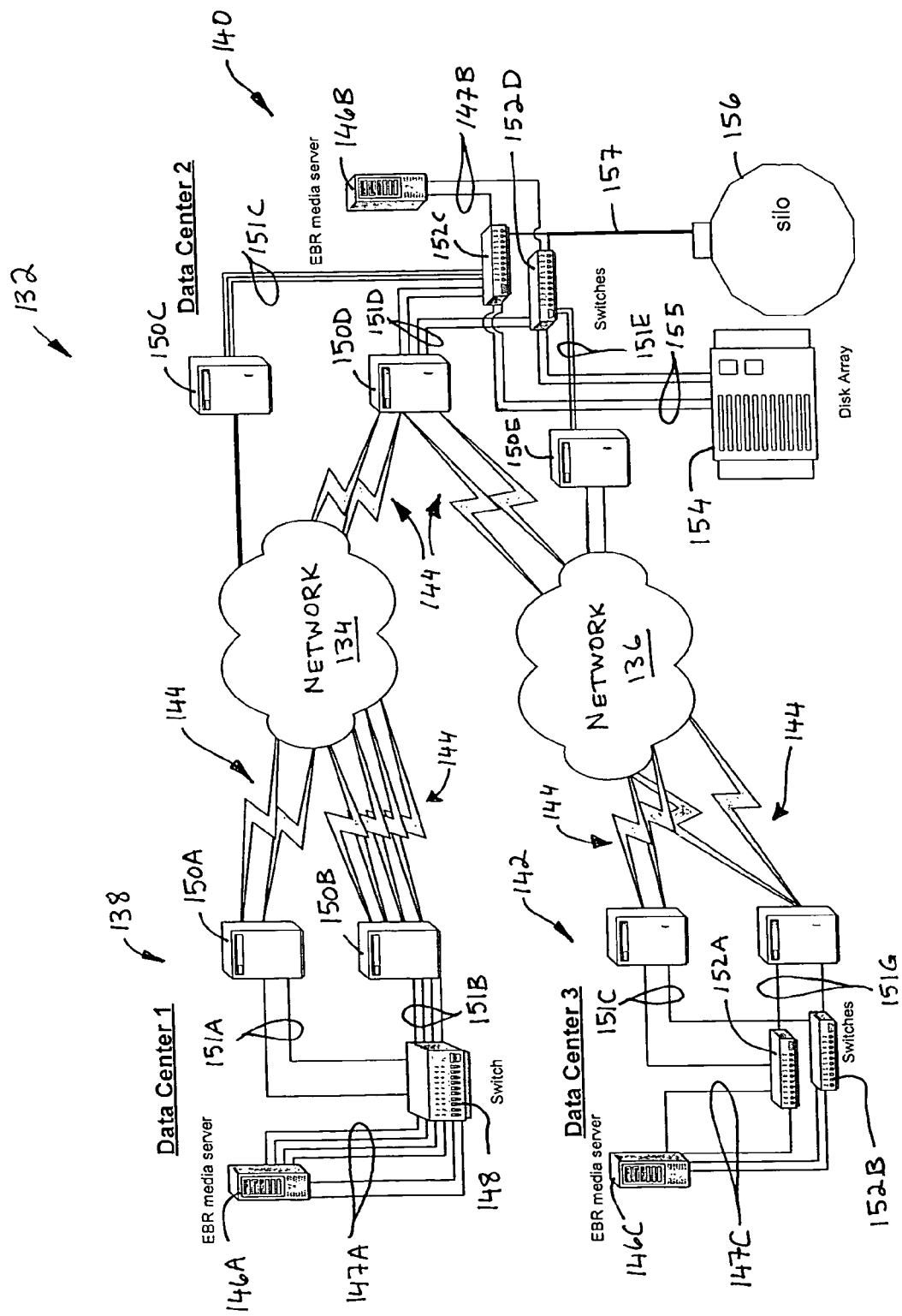
FIG. 13 illustrates one embodiment of an ASM hierarchical storage management (HSM) shared EBR remote disk drive architecture.

FIG. 13 illustrates an ASM hierarchical storage management (HSM) shared EBR remote disk drive architecture 132 according to one of many embodiments of the present invention. The shared EBR remote disk drive architecture 132 comprises, for example, three data centers each comprising an embodiment of an EBR network. The three data centers, Data Center-1, Data Center-2, and Data Center-3, each comprises an EBR network 138, 140, 142, respectively, for example. The data center networks 138, 140, 142 are interconnected for example via a first network 134 and/or a second network 136, for example, via a plurality of access circuits 144. In one embodiment of the present invention, the access circuits 144 are OC3 access circuits (Optical Carrier Level 3) that are the primary backbone to the Internet and can supply burstable bandwidth up to 155.52 Mbps. The access circuits 144 terminate at each EBR network 138, 140, 142 of Data Center-1, Data Center-2, and Data Center-3, respectively, for example, to provide the necessary connectivity between the various network components residing therein.

Each EBR network 138, 140, 142 comprises an EBR implementation. Although each network 138, 140, 142 may contain a similar EBR structure, generally they each comprise slightly different EBR network structures. The EBR network 138 at Data Center-1, for example, comprises a media server 146A in communication with a fabric switch 148 via fiber channels 147A, which in turn, is in communication with high-speed switching platforms 150A, B via fiber channels 151A, B, respectively. The high speed switching platforms 150A, B interconnect the EBR storage network 138 with the other EBR storage networks 140, 142, for example, across the first and second networks 134, 136 via the one or more access circuits 144 to create an enterprise wide storage area network (SAN). In one embodiment of the present invention, the high-speed switching platforms 150 A, B incorporate industry standard hardware and network protocols and is designed to support, for example fiber channel, SCSI, and ESCON interfaces. In general, the high-speed switching platforms 150A, B each include management and operating software to provide integrated, fault tolerant, and a highly manageable platform for use in remote storage applications.

The EBR network 142 at Data Center-3 comprises an architecture similar to the EBR network 138 in Data Center-1, with the exception that two separate fabric switches 152A, B are used rather than one. The EBR network 142 comprises a media server 146C in communication with the two fabric switches 152A, B via fiber channels 147C. Each fabric switch 152A, B is in communication with two high-speed switching platforms 150F, G via fiber channels 151C, G for interconnecting the EBR storage network 142 with the other EBR storage networks 138, 140, for example, across the first and second networks 134, 136 via the one or more access circuits 144 to create an enterprise wide SAN.

The EBR network 140 at Data Center-2 comprises an architecture similar to the EBR networks 138, 140 in Data Center-1 and Data Center-3, with the exception that it comprises an additional high-speed switching platform, an ASM disk array 154 for information storage, and a tape backup library 156 for backup. The ASM disk array 154 provides a network accessible storage space, for example, of 2.6 TB of storage. The tape backup library 156 includes for example a plurality of storage tape drives for backup storage and in one embodiment of the present invention it comprises six separate storage tape drives. The EBR network 140 comprises a media server 146B in communication with two fabric switches 152C, D via fiber channels 147B. Each fabric switch 152C, D is in communication with three high-speed switching platforms 150C, D, E via fiber channels 151C, D, E for interconnecting the EBR storage network 140 with the other EBR storage networks 138, 142, for example, across the first and second networks 134, 136 via the one or more access circuits 144 to create an enterprise wide SAN. The two fabric switches 152C, D also are in communication with disk array 154 via fiber channels 155 and the tape backup library 156 via fiber channel 157. Accordingly, each one of the EBR networks 138, 140, 142 at the three corresponding data centers have wide area network access to the disk array 154 and the tape backup library 156.

In one of many embodiments of the present invention, the media servers 146A, B, C are any suitable media servers provided by Sun, Hewlett-Packard, IBM, and Microsoft, for example, discussed previously. In one of many embodiments of the present invention the media servers 146, A, B, C include, for example, Sun E6500 and/or a Sun V880 with a Sun E450 for a cold spare. The fabric switches 148, 152A, B, C, D can be any suitable SAN fabric switch discussed previously, such as, for example, Brocade 3800 SAN fabric switches provided by Brocade. The high-speed switching platforms 150A, B, C, D, E, F, G are any suitable high-speed switching platform suitable for interconnecting storage systems and networks across wide areas to create enterprise-wide storage area networks, such as an UltraNet Storage Director provided by CNT, for example. The disk array 154 is an STK/LSI D178 disk array having 2.6 TB of storage space, for example. The tape backup library 156 is an STK L180 Automated Tape backup library with 9840 Tape Drives, for example.

Figure 14:
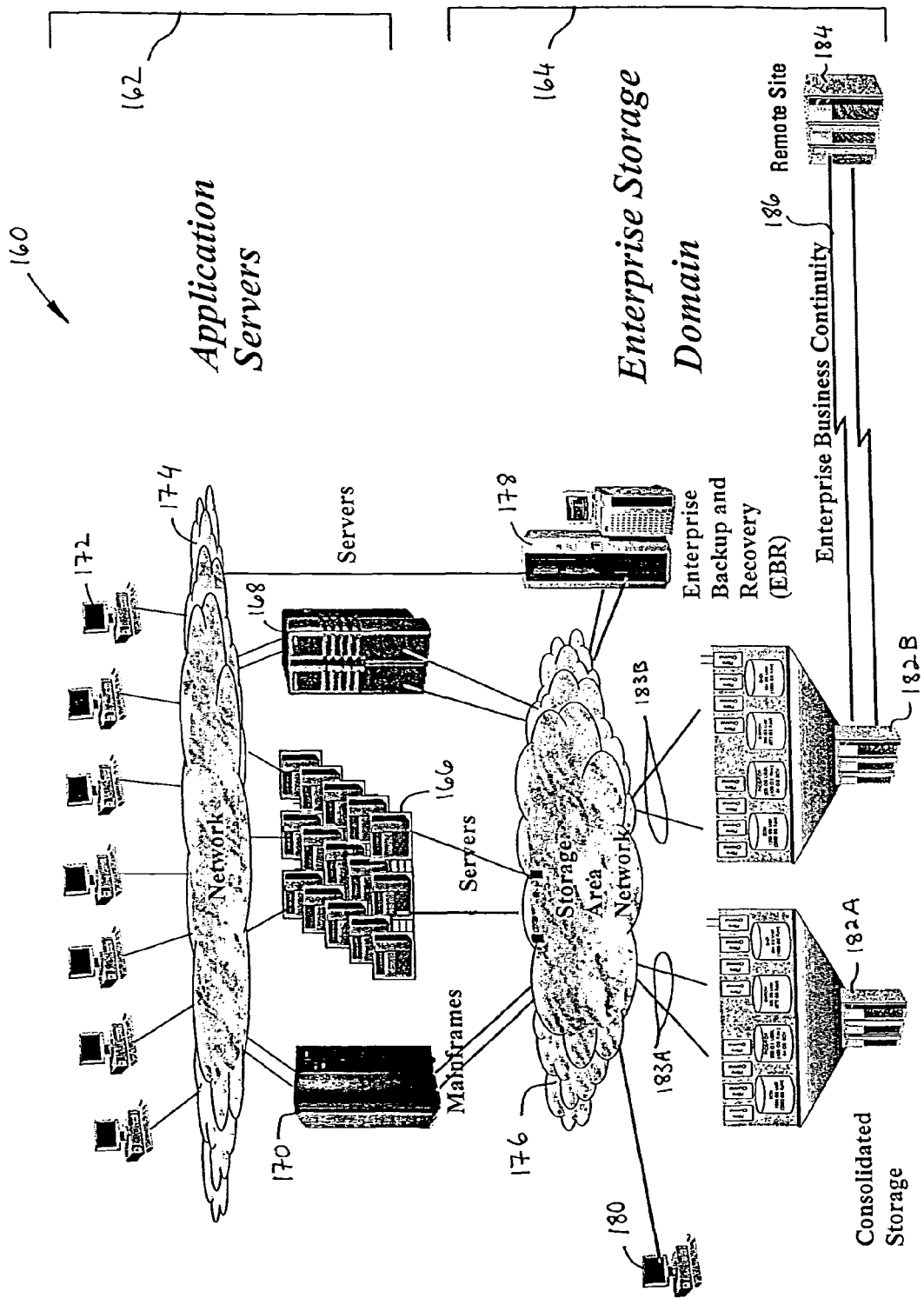
FIG. 14 illustrates one embodiment of an enterprise storage topology.

FIG. 14 illustrates an enterprise storage topology 160 according to one of many embodiments of the present invention. The topology 160 includes an "application servers" portion 162 and an "enterprise storage" portion 164. The "application servers" portion 162 comprises a plurality of servers 166, 168 and/or mainframe computers 170. The servers 166, 168 and mainframes 170 are in communication with a plurality of clients 172 across a user network 174. The servers 166, 168 and/or mainframes 170 also are in communication with the enterprise storage domain 164 via the SAN 176. The enterprise storage domain 164 comprises an EBR system 178 connected to both the SAN 176 and the user network 174. An enterprise control center 180 and one or more consolidated storage arrays 182A, B also are in communication with the SAN 176 via fiber channels 183A, B, respectively. The consolidated storage arrays 182A, B are in communication with a remote site 184 where enterprise BCVs are provided to the remote site 184 via the communication channel 186.

At the remote site 184 the BCVs are provided to a BCV device executing, for example, a Symmetrix TimeFinder software application, which provides a BCV solution for Symmetrix devices. In general, a BCV is a third mirror that contains a copy of data from online primary and mirror disks used for regular I/O operations from their host(s). The BCV copies can be used, for example, for backing up data, restoring data, supporting decisions, and testing applications. Each BCV contains its own host address and is configured as a stand-alone device, for example. There are numerous examples of usage for a BCV. Some of the uses include, for example, creating a mirrored copy of any active application volume or set of volumes within the same devices. Other uses include allowing the new copy to be used by another application or system, providing multiple copies of a single application volume, and backing up Web content refresh, data warehousing application testing, and updating third party software, for example. Other usage of the BCV include, for example, utilizing BCV with SQL Backtrack and EMC TimeFinder, for example, for a faster recovery time for applications requiring recovery back to a point in time.

Figure 15:
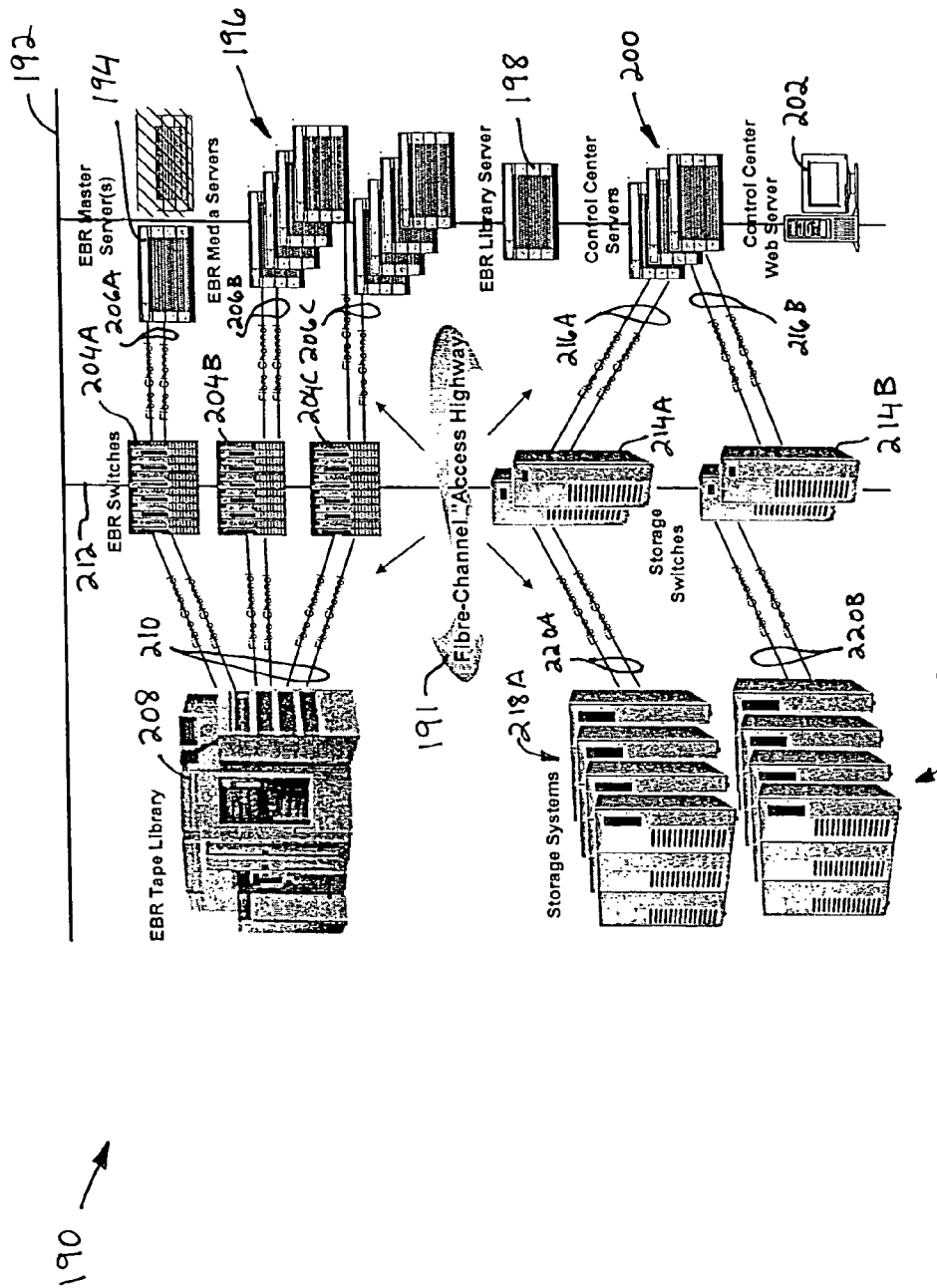
FIG. 15 illustrates one embodiment of an enterprise SAN management system.

FIG. 15 illustrates one embodiment of an enterprise SAN management system 190 comprising a backup network 192, such as, for example, a 100 Mb TCP/IP backup network. The system 190 comprises backup network 192 connected to one or more EBR master server(s) 194, one or more EBR media servers 196, an EBR library server 198, one or more control center servers 200, and a control center Web server 202, for example. The EBR master servers 194 and the EBR media servers 196 are in communication with an EBR tape backup library 208 for backup operations via one or more EBR switches 204A, B, C through fiber channels 206 A, B, C, respectively, for example. The EBR switches 204A, B, C are in communication with the EBR tape backup library via fiber channels 210. The EBR switches 204A, B, C also are in communication with the backup network 192 via a fiber channel 212. The EBR switches 204A, B, C also are in communication with one or more storage switches 214A, B via the fiber channel 212 forming a fiber channel access highway 191. The control center servers 200 are in communication with the storage switches 214A, B via fiber channels 216A, B, respectively, for example. The storage switches 214A, B are in communication with one or more storage systems 218A, B via fiber channels 220A, B, respectively, for example.

Figure 16:
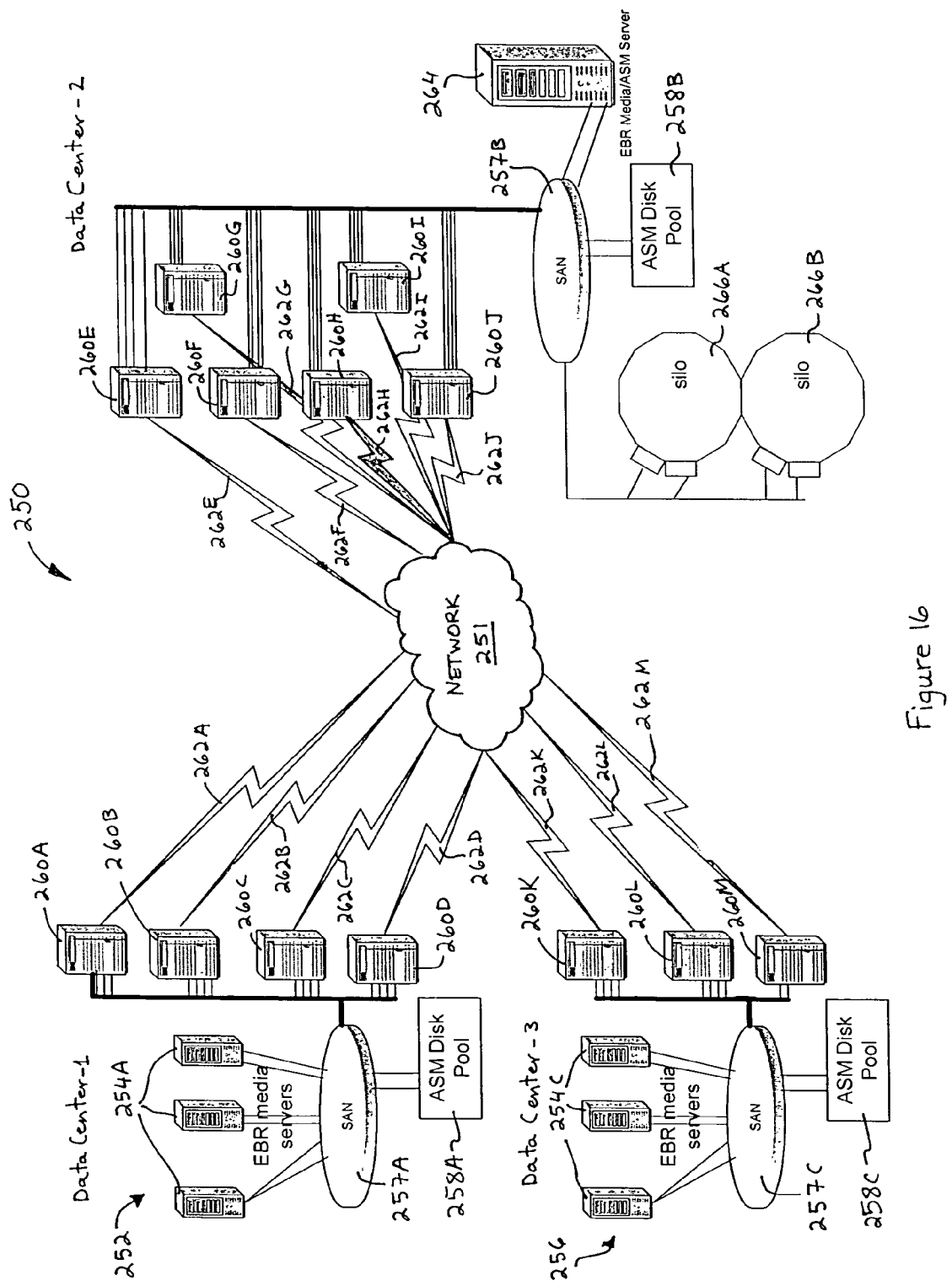
FIG. 16 illustrates one embodiment of an enterprise recovery system.

FIG. 16 illustrates an enterprise recovery system 250 according to one of many embodiments of the present invention. The enterprise recovery system 250 comprises EBR networks 252, 254, 256 associated with Data Center-1, Data Center-2, and Data Center-3, respectively. The EBR networks 252, 254, 256 are interconnected through wide area network 251 via one or more access circuits. The EBR network 252 at Data Center-1 comprises one or more EBR media servers 254A in communication with a storage area network (SAN) 257A. An automated storage manager (ASM) disk pool 258A is also in communication with the SAN 257A. One or more high-speed switching platforms 260A, B, C, D also are in communication with the SAN 257A. The high-speed switching platforms 260A, B, C, D provide access to the wide area network 251 via one or more access circuits 262A, B, C, D, for example. In one of many embodiments of the present invention, the access circuits 262A, B, C, D are OC3 access circuits (Optical Carrier Level 3) that are the primary backbone to the Internet and can supply burstable bandwidth up to 155.52 Mbps. The access circuits 262 terminate at each EBR network 252, 254, 256 in Data Center-1, data Center-2, and Data Center-3, respectively, for example, to provide the necessary connectivity between the various network components residing therein. The total amount of information storage and backup required in each EBR network determines the total amount of access circuits required. In the example of EBR network 252, 14 OC3 access circuits are provided.

The EBR network 254 at Data Center-2 comprises at least one EBR media/ASM server 264 in communication with a storage area network (SAN) 257B. An automated storage manager (ASM) disk pool 258B is also in communication with the SAN 257B. One or more high-speed switching platforms 260E, F, G, H, I, J also are in communication with the SAN 257B. The high-speed switching platforms 260E, F, G, H, I, J provide access to the wide area network 251 via one or more access circuits 262 E, F, G, H, I, J, for example. In one of many embodiments of the present invention, the access circuits 262 E, F, G, H, I, J also are OC3 access circuits. The total amount of information storage and backup required at the EBR network 254, for example, requires 24 OC3 access circuits. One or more tape libraries 266A, B are in communication with the SAN 257B.

The EBR network 256 at Data Center-3 comprises one or more EBR media servers 254C in communication with a storage area network (SAN) 257C. An automated storage manager (ASM) disk pool 258C also in communication with the SAN 257C. One or more high-speed switching platforms 260K, L, M also are in communication with the SAN 257C. The high-speed switching platforms 260K, L, M provide access to the wide area network 251 via one or more access circuits 262K, L, M, for example. In one of many embodiments of the present invention, the access circuits 262K, L, M are OC3 access circuits (Optical Carrier Level 3) that are the primary backbone to the Internet and can supply burstable bandwidth up to 155.52 Mbps. The access circuits 262 terminate at each EBR network 252, 254, 256 in Data Center-1, Data Center-2, and Data Center-3, respectively, for example, to provide the necessary connectivity between the various network components residing therein. The total amount of information storage and backup required at the EBR network 256, for example, requires 10 OC3 access circuits.

Figure 17:
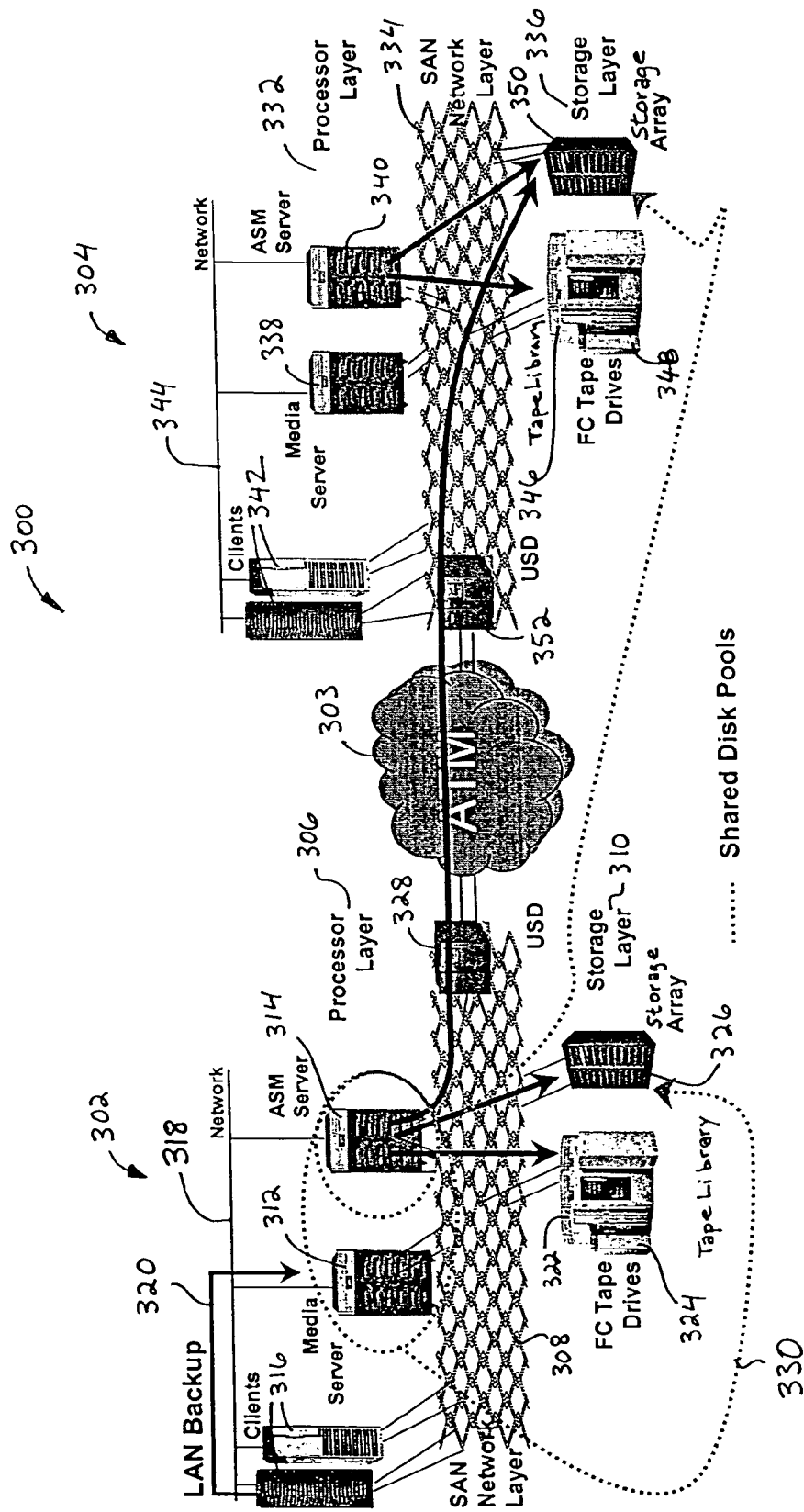
FIG. 17 illustrates one embodiment of an application storage manager (ASM) based hierarchical storage management (HRM) system.

FIG. 17 illustrates an application storage manager (ASM) based hierarchical storage management (HSM) system 300 according to one of many embodiments of the present invention. The ASM-HSM system 300 provides hierarchical storage management for open systems and provides the capability of managing information contained in different storage media (e.g., disk, tape, optical) residing in various storage locations (e.g., local and remote). In one of many embodiments of the present invention, the ASM-HSM system 300 enables information located in various widely distributed data centers to be written first to a local disk pool at the data center, then to a local tape, and then replicated via fiber channel over a network (e.g., an ATM network) to remote disk pool in a remote data center, and then to tape in the remote data center, such as, for example, an EBR storage silo.

The ASM-HSM system 300 comprises at least a local storage and backup network 302 and a remote storage and backup network 304 interconnected via a network 303, which in one embodiment of the present invention is an ATM network. The local storage and backup network 302 includes three layers: a processor layer 306; a SAN network layer 308; and a storage layer 310. The processor layer 306 comprises a media server 312, an ASM server 314, and one or more clients 316. The media server 312, the ASM server 314, and the clients 316 are in communication with a network 318 (e.g., a LAN), which in one embodiment is a TCP/IP network, for example. The clients 316 provide the media server 312 with the LAN backup information 320, which is stored in the disk storage array 326 under the control of the ASM server 314, for example. The storage layer 310 comprises a tape backup library 322 including a plurality of fiber channel tape drives 324 and a disk storage array 326. The tape backup library 322 is used for backing up information and the storage array 326 is used for storing information. The processor layer 306 and the storage layer 308 are interconnected via the SAN network layer 308. The ASM server 314 manages the movement of information from the local network 302 to the remote network 304 via a high-speed switching platform 328, which in one of many embodiments of the present invention is an UltraNet Storage Director provided by CNT, for example. The high-speed switching platform 328 interfaces with the network 303 and moves the information to the remote network 304 under control of the ASM server 314. The dotted line indicates the shared disk pools 330 between the local network 302 and the remote network 304.

The remote storage and backup network 304 also includes three layers: a processor layer 332; a SAN network layer 334; and a storage layer 336. The processor layer 332 comprises a media server 338, an ASM server 340, and one or more clients 342. The media server 338, the ASM server 340, and the clients 342 are in communication with a network 344 (e.g., a LAN), which in one embodiment is a TCP/IP network, for example. The storage layer 336 comprises a tape backup library 346 including a plurality of fiber channel tape drives 348 and a disk storage array 350. The tape backup library 348 is used for backing up information from the local network 302 as well as the remote network 304, and the disk storage array 350 is used for storing information from the local network 302 as well as the remote network 304. The processor layer 332 and the storage layer 336 are interconnected via the SAN network layer 334. The ASM server 340 manages information transmitted from the local network 302 to the remote network 304. The high-speed switching platform 352, which in one of many embodiments of the present invention is an UltraNet Storage Director provided by CNT, for example, interfaces with the network 303. The high-speed switching platform 352 is under control of the ASM server 240 and receives the information from the local network 302 to be stored and backed up in the remote network 304. The ASM server 340 manages the movement of information to the disk storage array 350 and manages the storage of information to the tape backup library 346.

In operation, at the local network 302, the network 318 backup information is written to the disk storage array 326 under the control of the ASM server 314. The media server 312 and the ASM server 314 share access to the disk storage array 326. The ASM server 314 then manages the writing of information stored in the disk storage array 326 to the tape backup library 322. Because the local network 302 based ASM server 314 shares access to the remote network 304 based disk storage array 350, the ASM server 314 manages the movement of information to the remote network 304 based disk storage array 350. The ASM server 340 then begins the management of the information at the remote network 304 site and writes the information to the remote network 304 based tape backup library 346.

The invention claimed is:

1. An enterprise data backup and recovery system comprising:
   a first network and a second network in communication through a third network the first network comprising:
      a first processing layer, wherein the first processor layer comprises:
         a first media server;
         a first application storage manager server in communication with the first media server via a first local area network; and
         a first client in communication with the first media server via the first local area network; wherein the information is transferred to the first media server and to the first storage layer, wherein the first local area network includes a routing switch in communication with a backup master server and multiple uplink connections from the routing switch to a plurality of port switches that provide connective points of a plurality of local area network clients, wherein each connection to the pairs of port switches comprises a secure connection to a first port switch and a non-secure connection to a second port switch, wherein both the secure and the non-secure connections terminate and originate with the backup master server which is security enabled;
      a first storage area network layer in communication with the first processor layer;
      a first storage layer in communication with the first process layer;
      a first switching platform in communication with the first storage area network layer, wherein the first switching platform is in an interface to a first access circuit terminating at the first network;
   the second network comprising:
      a second processor layer;
      a second storage area network layer in communication with the second processor layer;
      a second storage layer in communication with the second storage area network layer;
      a third storage layer in communication with the second storage area network and in communication with one or more application servers via a dedicated data connection;
      a second switching platform in communication with the second storage area network layer, wherein the second switching platform is an interface to a second address circuit terminating at the second network; and
   wherein, the first and second storage area layers are shared by the first and second networks via the third network; and
   wherein information stored in the first storage layer is transferred to the second storage layer via the third network under the control of the first processor layer; and
   wherein the first and second access circuits provide connectivity between components of the first and second networks via the first and second switching platforms.

2. The system of claim 1, wherein the second processor layer further comprises:
   a second media server;
   a second application storage manager server in communication with the second media server via a second local area network; and
   wherein the second storage layer further comprises:
      a second disk storage array in communication with the second application storage manager server for storing information; and
      a second backup library in communication with the second application storage manager server for storing the information;
   wherein the second application storage manager server controls the movement of the information from the second disk storage array to the second backup library.

3. The system of claim 2, wherein the second disk storage array is in communication with the second backup library via a fiber channel.

4. The system of claim 2, wherein the second disk storage array is in communication with the second application storage manager server via a fiber channel.

5. The system of claim 2, wherein the second backup library is in communication with the second application storage manager server via a fiber channel.

6. The system of claim 1 further comprising a second switch in communication with the second storage area network layer for receiving the information from the third network.

7. The system of claim 1, wherein the first network is a network based backup and recovery network.

8. The system of claim 1, wherein the first network is a network based gigabit Ethernet network.

9. The system of claim 1, wherein the first network is a LAN-free dictated tape drive network.

10. The system of claim 1, wherein the first network is a server-free network.

11. An automated storage manager server resident on a first storage area network, comprising a processor that:
   transfers information from a first storage region resident on the first storage area network to a second storage region resident on the first storage area network, wherein the first storage region is in direct communication through a dedicated data connection to one or more application servers; and
   transfers information from the second storage region to a third storage region resident on a second storage area network via the third network,
   wherein the server is connected via uplink and downlink gigabit connections to a routing switch for providing bandwidth for backup and recovery, and wherein the server is a backup master server connected with the uplink connections from the routing switch to a plurality of port switches that provide connective points of a plurality of local area network clients, wherein each connection to the pairs of port switches comprises a secure connection to a first port switch and a non-secure connection to a second switch, wherein the secure and the non-secure connections terminate and originate with the backup master server which is security enabled.

12. The automated storage management server of claim 11, wherein the processor transfers information by communicating with a first disk storage array of the first storage region and a first backup library of the first storage region.

13. The automated storage management server of claim 11, wherein the processor communicates with the first disk storage area via a fiber channel.

14. The automated storage management server of claim 12, wherein the processor communicates with the first disk storage area via a fiber channel.

15. The automated storage management server of claim 11, wherein the processor transfers information from the second storage region to the third storage region via one or more switches.

16. The automated storage management server of claim 11, wherein the processor transfers information from the second storage region to the third storage region via an asynchronous transfer mode network.

17. The automated storage management server of claim 11, wherein the processor transfers information for the first storage region to the second storage region via a gigabit Ethernet network.

* * * * *